United States Patent
Fox

(10) Patent No.: US 12,205,160 B2
(45) Date of Patent: *Jan. 21, 2025

(54) SYSTEMS AND METHODS FOR SYNCHRONIZED PRE-ORDERED ITEM PREPARATION AT DINE-IN LOCATIONS

(71) Applicant: Blue Baker, LLC, College Station, TX (US)

(72) Inventor: David C. Fox, College Station, TX (US)

(73) Assignee: Blue Baker, LLC, College, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,941

(22) Filed: Sep. 11, 2023

(65) Prior Publication Data

US 2023/0419388 A1    Dec. 28, 2023

Related U.S. Application Data

(63) Continuation of application No. 17/989,581, filed on Nov. 17, 2022, now Pat. No. 11,756,103, which is a continuation-in-part of application No. 17/532,077, filed on Nov. 22, 2021, now Pat. No. 11,694,285, which is a continuation-in-part of application No. 16/504,123, filed on Jul. 5, 2019, now Pat. No. 11,182,864, which is a continuation-in-part of application No. 15/168,952, filed on May 31, 2016, now Pat. No. 10,402,920.

(Continued)

(51) Int. Cl.
*G06Q 50/12* (2012.01)
*G06Q 10/02* (2012.01)
*G06Q 30/0601* (2023.01)

(52) U.S. Cl.
CPC ......... *G06Q 30/0635* (2013.01); *G06Q 10/02* (2013.01); *G06Q 50/12* (2013.01)

(58) Field of Classification Search
CPC .... G06Q 30/0635; G06Q 10/02; G06Q 50/12; G06Q 30/0641; G06Q 30/0621
USPC .......................................................... 705/5
See application file for complete search history.

(56) References Cited

U.S. PATENT DOCUMENTS 7,680,690 B1    3/2010  Catalano
8,059,029 B2 *  11/2011  Juang ..................... G01S 19/34
                                                 342/357.65

(Continued)

FOREIGN PATENT DOCUMENTS

CA    2509734 A1    4/2006
CA    2760307 A1    2/2012

(Continued)

OTHER PUBLICATIONS

International Search Report and Written Opinion for PCT Application No. PCT/US2023/080344, dated Mar. 20, 2024, 13 pages.

(Continued)

*Primary Examiner* — Garcia Ade
(74) *Attorney, Agent, or Firm* — Dickinson Wright PLLC; Stephen A. Mason; Jonathan H. Harder

(57) ABSTRACT

Systems and restaurant locations for use with a mobile ordering system, and methods thereof, to provide at least more time-efficient pick up of orders or dine-in practices by customers than with traditional ordering, pick up windows, and dine-in practices.

20 Claims, 18 Drawing Sheets

Related U.S. Application Data

(60) Provisional application No. 62/191,772, filed on Jul. 13, 2015.

(56) References Cited

U.S. PATENT DOCUMENTS

| | | | |
|---|---|---|---|
| 9,105,041 | B2 | 8/2015 | Harman |
| 9,129,289 | B2 | 9/2015 | Vaughn et al. |
| 9,406,084 | B2 | 8/2016 | Havas |
| 10,026,055 | B2 | 7/2018 | Riel-Dalpe et al. |
| 10,204,373 | B2 | 2/2019 | Pugh et al. |
| 10,321,263 | B1 * | 6/2019 | AlKarmi ............ G06Q 30/0601 |
| 10,360,616 | B2 | 7/2019 | Lopez et al. |
| 10,445,819 | B2 | 10/2019 | Renfroe |
| 10,572,476 | B2 | 2/2020 | Skinder |
| 10,679,278 | B2 | 6/2020 | Harman |
| 10,740,715 | B1 | 8/2020 | Kumar et al. |
| 2002/0188492 | A1 | 12/2002 | Borton |
| 2004/0044578 | A1 | 3/2004 | Kim et al. |
| 2006/0178943 | A1 | 8/2006 | Rollinson et al. |
| 2006/0293971 | A1 | 12/2006 | Hunter et al. |
| 2009/0106124 | A1 | 4/2009 | Yang |
| 2009/0187488 | A1 | 7/2009 | Shamilian |
| 2009/0204492 | A1 | 8/2009 | Scifo et al. |
| 2012/0078673 | A1 | 3/2012 | Koke et al. |
| 2013/0151380 | A1 | 6/2013 | Holt |
| 2014/0074743 | A1 | 3/2014 | Rademaker |
| 2014/0100971 | A1 * | 4/2014 | Klearman .......... G06Q 30/0641 |
| | | | 705/15 |
| 2014/0279081 | A1 | 9/2014 | Marx et al. |
| 2014/0330672 | A1 | 11/2014 | Olszewski et al. |
| 2015/0227890 | A1 | 8/2015 | Bednarek et al. |
| 2016/0244311 | A1 * | 8/2016 | Burks ................. B67D 1/0888 |
| 2016/0275470 | A1 * | 9/2016 | Straw .................... H04W 4/029 |
| 2018/0012210 | A1 | 1/2018 | Harman |
| 2018/0109908 | A1 | 4/2018 | Swanson et al. |
| 2019/0122291 | A1 | 4/2019 | Fang et al. |
| 2021/0374885 | A1 * | 12/2021 | Musk ............... G06Q 20/40155 |
| 2022/0101250 | A1 | 3/2022 | Wang et al. |

FOREIGN PATENT DOCUMENTS

| | | |
|---|---|---|
| CA | 2834875 A1 | 11/2012 |
| EP | 2551808 A1 | 1/2013 |
| EP | 2707848 A2 | 3/2014 |
| JP | 2003187115 A | 7/2003 |
| KR | 100597520 B1 | 7/2006 |
| MX | 03010839 A | 10/2004 |
| WO | 2000039722 A1 | 7/2000 |

OTHER PUBLICATIONS

International Search Report and Written Opinion for PCT Application No. PCT/US2023/081772, dated Mar. 7, 2024, 11 pages.

* cited by examiner

700

702 — Providing interactive menu and ordering information to a customer, wherein the interactive menu displays menu information available at a dine-in location 704 — Receiving a provisional input from the customer comprising (i) one or more menu selections, and (ii) real-time telematics information of the customer, wherein the real-time telematics information is based on a global position of the customer and current driving information 706 — Responsive to receiving the provisional input, determining an arrival time of the customer to the dine-in location 708 — Transmitting the arrival time of the customer and the one or more menu selections to the dine-in location 710 — Optimizing an order completion time based on the real-time telematics and the arrival time of the customer to the dine-in location

FIG. 7

ORDER ID: D10     2:00PM
Arrival Time: 24 minutes
Fire Time: 2:06 – 2:22 PM
Order Completion Time: 2:22 PM

| Item | Cook Time |
|---|---|
| Sandwich | 10 minutes |
| Coke (x2) | >1 minute |
| Burger | 16 minutes |

ORDER ID: D15     2:00PM
Arrival Time: 19 minutes
Fire Time: 2:07 – 2:17 PM
Order Completion Time: 2:17 PM

| Item | Cook Time |
|---|---|
| Pizza | 10 minutes |
| Coke | >1 minute |
| Cookie | 3 minutes |

ORDER ID: D1...
Arrival Time: ...
Fire Time: 2:3...
Order Comple...

| Item |
|---|
| Burger |
| Coke |
| Sandwich |

FIG. 9B

D07: Table 11 (Arrived)
Drinks Served
Food Served

D08: Tables 12 and 13 (Arrived)
Drinks Served
Food Served

D12: Table 6 (Arriving 2:01 PM)
Drinks Served
Food Arriving Now

D15: Table 14 (Arriving 2:19 PM)
Drinks In Preparation
Food In Preparation

FIG. 10

SYSTEMS AND METHODS FOR SYNCHRONIZED PRE-ORDERED ITEM PREPARATION AT DINE-IN LOCATIONS

CROSS-REFERENCE TO RELATED APPLICATION

This application is a continuation of patent application Ser. No. 17/989,581 filed Nov. 17, 2022, now U.S. Pat. No. 11,756,103, which is a continuation-in-part of U.S. patent application Ser. No. 17/532,077, filed Nov. 22, 2021, now U.S. Pat. No. 11,694,285, which is a continuation-in-part of U.S. patent application Ser. No. 16/504,123, filed Jul. 5, 2019, now U.S. Pat. No. 11,182,864, which is a continuation-in-part of U.S. patent application Ser. No. 15/168,952 filed May 31, 2016, now U.S. Pat. No. 10,402,920, which claims the benefit of U.S. Provisional Patent Application No. 62/191,772, filed Jul. 13, 2015, and the contents and disclosures of all applications are incorporated herein by reference in their entirety for all purposes.

FEDERALLY SPONSORED RESEARCH

Not Applicable

SEQUENCE LISTING

Not Applicable

BACKGROUND

Customers of restaurants, especially to-go customers, do not wish to wait to pick up their food. In particular, customers who have pre-ordered their meals do not wish to be trapped in line waiting for other customers to order, or waiting on a larger order to be cooked and completed before picking up their food. This problem is especially pronounced as customers expand their expectations for more efficient pick up beyond fast food restaurants and to higher end restaurants.

For example, for fast casual and casual dining restaurants that offer customers the ability to pick up ordered food from a delivery or pick up window, time is of special importance. Customers do not wish to wait.

As another example, in dine-in restaurants, customers do not wish to wait long periods of time after ordering for their food to come to the table. In the typical dine-in ordering process, customers wait to be seated, wait to read menus offered at the restaurant, wait to order drinks, wait to order food, and wait to pay for the meal. At times, in an effort to reduce wait times in the restaurant, customers will park in the parking lot of the dine-in establishment and wait to enter until they are ready for the entire ordering process. Thus, an additional wait can occur for available parking spaces or space in a queuing line when customers with dine-in orders wait in the parking lot. Moreover, in such examples, the restaurant is hindered as well since the delay in serving the customer will slow the turn-over rate of each table in the restaurant and, accordingly, will slow the turn-over rate of parking spaces at the dine-in restaurant.

FIELD

This disclosure relates to drive-through, pick up, and delivery ordering and delivery systems and methods for restaurants. In another embodiment, this disclosure relates to ordering systems and methods for dine-in restaurants that can obtain a customer order and begin service prior to customer entering the dine-in restaurant.

DESCRIPTION OF THE RELATED ART

For many restaurants the preparation time significantly varies between menu items, and order completion time is determined by multiple dynamic variables: staffing levels, staff position training, staff skill levels, prior orders in progress, inventory on hand, order size, order complexity, and by the longest preparation time of any one item on an order.

In customary drive-through restaurants, customers are served in the sequence of order placement or arrival at the restaurant order queue (a sequential, linear queue) so there can be a significant wait in a queue for delivery of an order even if the preparation time is short, because the delivery is made in the sequence of orders received; not when the orders are ready for pick up. This results at least partially from the arrangement of drive-through parking lots with sequential drive lanes. Moreover, considerable time is typically spent in payment at the pick-up window.

In customer dine-in restaurants, customers must first wait for a table to be cleared, then wait for a server to come and take their order, and then wait for the food to be prepared. At times, the ordering process from the wait staff at the dine-in restaurant can require a series of interactions before the customer's food order is placed. Moreover, at peak dining hours, a wait staff may be so busy that some customers must wait prolonged periods of time before their orders are even taken. Once the order is taken, the customer must then sit at the table and wait until the kitchen completes cooking the order and the wait staff has the time to bring the food order out to the customer's table.

What is needed is a system or methods which solves these time-wasting problems and allows customers the convenience of a more efficient drive through window or more efficient dine-in ordering process, while potentially being served a higher quality menu (such as that typically found in fast casual and casual restaurants), which requires longer food preparation times, and further can allows customers to receive a more reliable expectation of order completion. Such a system and method will further allow for facilitation of quicker turn-over time in parking spaces and allow queuing line real estate by moving customer vehicles through the process quicker, which in turn will allow for a more efficient customer experience for both dine-in and pick-up customers.

BRIEF SUMMARY OF THE INVENTION

This disclosure is, in general embodiments, a restaurant location for use with an ordering system with production timing and slip logic, and restaurant locations configured to provide non-sequential pick up of orders as the orders are ready, and methods for use thereof. The present disclosure provides at least more time-efficient pick up of orders by customers than with traditional ordering and pick up windows.

This disclosure is also, in general embodiments, a restaurant location for use with an ordering system with production timing and slip logic, and restaurant locations configured to provide synchronized pre-ordered item preparation based on real-time telematics from a customer's device, and methods for use thereof. The present disclosure provides at least more time-efficient dine-in orders by customers than with traditional dine-in restaurant processes.

BRIEF DESCRIPTION OF THE DRAWINGS

Various embodiments of the present embodiments are described with reference to the following FIGURES. Like reference numerals therein refer to like parts throughout the various views unless otherwise specified. Embodiments and portions of embodiments illustrated and described herein are non-limiting and non-exhaustive.

FIG. 7 is a method displaying the process of an embodiment of the present disclosure.

FIG. 9B is a schematic view of a possible visual display in the restaurant of an embodiment of the present disclosure after an order has been updated on a mobile device.

FIG. 10 is a schematic view of a possible visual display in the restaurant of an embodiment of the present disclosure showing status of an order.

DETAILED DESCRIPTION

Figure 1:
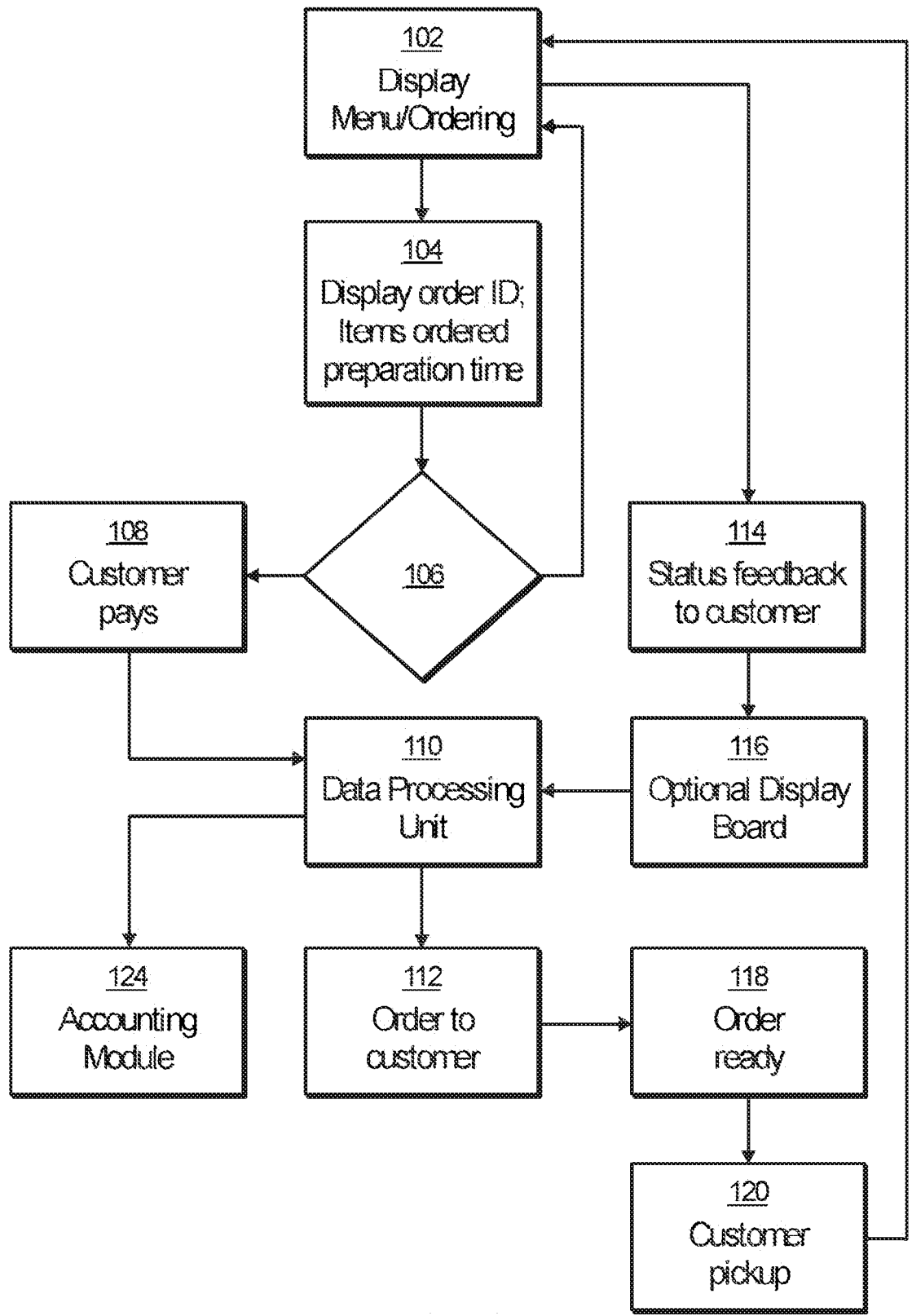
FIG. 1 is a flow diagram of the process of an embodiment of the present disclosure.

The following description of various embodiments of the present disclosure, combined with the associated drawings, enables persons of ordinary skill in the art to both practice the preferred embodiments of the present disclosure, and to understand related applications and embodiments of the present disclosure that may not be specifically set forth, but are encompassed by the specification and claims.

General Embodiment

This disclosure is, in general embodiments, a restaurant location for use at least with a mobile ordering system to provide at least more time-efficient pick up of orders by customers than with traditional ordering and pick up windows.

This disclosure is, in some embodiments, a restaurant location for use at least with a mobile ordering system, comprising a restaurant building (which is, in various embodiments, a building, multiple buildings, a food truck, a food stand, some other discrete physical restaurant structure, or a combination thereof) having an order pick up window and associated order pick up area configured only for pick-up of pre-paid orders. In some such embodiments, the restaurant location further comprises a parking lot at least partially around the building, and having a drive-through lane that allows vehicles to pull adjacent to the order pick up window. In some embodiments, the restaurant location also comprises a plurality of queuing spaces, being parallel, single-vehicle, parking spaces in the parking lot, each queuing space opening directly into the drive-through lane such that each queuing space provides independent, non-sequential access to the drive-through lane. In some embodiments, the restaurant location further comprises an order status display positioned and sized to be visible both to customers in the queuing spaces, and to customers in or approaching the drive-through lane but not yet approaching the order pick up window.

In some embodiments, each queuing space opens directly into at least one drive-through lane such that each queuing space provides independent, non-sequential access to that space's drive-through lane, the order status display is positioned and sized to be visible to customers in the queuing spaces and to customers in or approaching a drive-through lane but not yet approaching the order pick up window; and a merging means to direct vehicles from the several drive-through lanes to approach the order pick up window.

In some embodiments, the restaurant location comprises at least one drive-through order placement station separate from and before the order pick up window and placed accessible from at least one drive-through lane.

In some embodiments, a dine-in location includes a system for synchronized pre-ordered item preparation, which includes a restaurant building including a dining area and a kitchen, where the kitchen has a plurality of tables; one or more first visual displays, positioned inside the dining area, configured to display an arrival time of the customer to the restaurant building and a corresponding table, where the corresponding table is one or more of table in the plurality of tables; a second visual display, positioned inside the kitchen, configured to display an order fire time, a corresponding order completion time, the arrival time of the customer, and the corresponding table; and a dine-in location server, where the dine-in location server is communicatively couple to a dine-in application for use on a customer device of the customer.

In some embodiments, a dine-in location utilizes a system for synchronized pre-ordered item preparation at the dine-in location, where the system includes a customer device including at least one processor; a dine-in application for use on the customer device; a real-time telematics device communicatively coupled to the customer device, where the real-time telematics device includes a processor with a graphical interface and is configured to collect real-time telematics information of the customer based on a global position of the customer device and current driving information; and a dine-in location server configured to provide one or more menu selection information, where the dine-in location server is communicatively coupled to the dine-in application for use on the customer device.

In some embodiments, a dine-in location server is communicatively coupled to a dine-in application for use on a customer device, where the communication causes at least one processor on the customer device to provide interactive menu and ordering information to a customer, where the interactive menu is configured to display menu information available at a dine-in location; receive a provisional input from the customer including one or more menu selections, and real-time telematics information of the customer, where the real-time telematics information is based on a global position of the customer device and current driving information; determine an arrival time of the customer to the dine-in location; transmit the arrival time of the customer and the one or more menu selections to the dine-in location; and optimize an order completion time based on the real-time telematics and the arrival time of the customer to the dine-in location.

The present system and methods provides a significant advantage in accurate expected wait times. In particular, it provides an advantage over the typical requirement for customers that desire an estimated wait time to call or walk-in to the restaurant location, and receive a mentally calculated estimate from wait staff. The current order system allows customers to receive an estimated order-ready time before placing their order and without having to directly contact the restaurant.

Furthermore, it allows a more accurate order ready time, instead of either being inconvenienced by an over-ambitious estimate that is too short and requires the customer to wait longer than expected, or by an overly-conservative estimate that unnecessarily discourages the customer from ordering.

In some embodiments, wait staff greet the customer by name, verbally confirm the order, or some combination thereof, before handing the order to the customer or serving the order to a customer's table. The ordering system and non-sequential pick up does not eliminate human interaction. Instead, it minimizes frustrating human interaction (such as trying to accurately place an order over a drive-through microphone), and allows the human interaction to be more positive, such as greeting a customer by name and with a smile, and handing a fresh, accurate order to a customer. In certain embodiments, the customer may select the table that the customer desires based on a list of available tables at the time of arrival. In such embodiments, the customer may select particular table preferences, such as for example booth, bar seating, outdoor seating.

Exemplary Advantages

Various embodiments of the present disclosure provide a multitude of advantages over current ordering, production, and delivery systems. A non-exhaustive, non-limiting, list of example advantages of some embodiments are provided hereafter.

Menu Quality

In various embodiments, the system and process presented herein provide restaurants the ability to offer customers a combination of a higher quality menu typically associated with greater wait times, and the ordering and pick up convenience typically associated with lower quality fast food menus. Heretofore, restaurants with a high percentage of drive-through orders (typically greater than fifty percent) had to restrict their menu to orders that could be prepared quickly to prevent the line growing uncontrollably and excessive wait times between order placement and order pick up.

The present system and methods allow the longer preparation times, such as is necessary in 'home-cooking,' in healthier menus, and in more customized or more variable menus, to be accounted for while preserving customer convenience, by pre-ordering. It also allows the greater variations in preparation times associated with a varied menu to be accounted for by a production timing and slip-logic order system. Accordingly, the restaurant prepares orders more efficiently, eliminating inefficiencies in order preparation time, orders not ready when expected, and orders ready substantially before expected. The greater efficiency allows the effect of longer preparation times to be minimized by removing 'overhead' time that was lost in inefficiency in previous systems and methods, thereby reducing the impact of the longer preparation time on the time-to-ready that affects customers.

Customer Interaction and Convenience

Embodiments of the present disclosure provide further advantages in accommodating customer personalities, moods, etc., and in providing customers with a more relaxed and friendly order placement and pick up experience. In particular, the ability to pre-order on a mobile device, computer, or kiosk, allows a customer to explore the menu at their leisure instead of being pressured to quickly make decisions by other customers waiting behind them, or by a hurried wait staff waiting to receive their order. Indeed, in a prototype embodiment of an embodiment of this disclosure using a non-sequential order pick up lane and window, and a mobile ordering system, it was found that mobile orders resulted in an increased engagement of customers with the menu, increased amount of time customers spent creating an order, a greater level of customization, and an increased number of menu options added to orders.

Many customers are uncomfortable with excessive interaction: they may feel awkward, they may fear engaging a new restaurant because they are not familiar with it, they may tend to be introverted and prefer limiting unnecessary engagement with random people, they may have had a stressful day and not feel like the extra effort to engage people at the moment, they may be in a hurry and find it more efficient to interact with a device as it is convenient for them rather than dedicating the time to go place their order in person, etc. Whatever the reason, allowing pre-ordering, especially through a website, mobile device, etc. allows the customer to place an order without a) the stress of interacting with an often hurried order taker, and b) dedicating the time to place an order and wait for order preparation. The combination of slip-logic queuing, accurate estimation of order ready time, and notifying customers when the order is ready, enables pre-ordering to work smoothly and efficiently, without previous problems associated with pre-ordering, such as customers forgetting their order, losing track of time, or having to 'activate' their order upon arrival and wait for the order to be prepared.

Embodiments of the present disclosure offer distinct advantages to customers in convenience and speed, as referred to elsewhere herein. An order pick up window(s) configured solely for pre-orders, especially mobile orders, alleviates the frustration to a customer of pre-ordering, and then being trapped in line behind non pre-orders. Additionally, pre-ordering through a customer-centric mobile application or website allows convenient re-ordering. For example, if a customer regularly places one or several orders, the customer is able, in some embodiments, to access their account and simply 're-order' instead of having to build the order time and time again, or to verbally dictate their order again and again to an order taker at a drive-through location.

Restaurant Advantages

Furthermore, embodiments of the present disclosure provide advantages to restaurants in increasing order accuracy, increasing customer service, and improving the working environment for staff, thereby contributing to a better experience for customers. In particular, the removal of microphones from the order pick up lane and window, in combination with mobile and online orders, reduces the stress of understanding customer's verbal orders, increases order accuracy and so decreases customer tension over inaccurate orders, and allows wait staff to greet customers picking up their orders with a friendly, un-harried, smile and greeting. The reduction or elimination of phone calls seeking information and placing orders over the phone (due in part to direct mobile and online orders, and due in part to the ordering system, discussed elsewhere, allowing calls to be taken at a quiet, central location) reduces the stress on wait staff, and allows phone conversations to be in a quiet and calm environment without the background noise of a busy restaurant environment.

Mixed Pre-Order and In-Line Ordering

Additionally, the present system and methods provide an advantage over various systems and methods that seek to improve upon fast food ordering by taking pre-orders, and then mixing pre-order customers and customers ordering in-line in the same order and pick up line(s).

In various embodiments, taking orders over a mobile device or other internet-enabled device, calculating an accurate order-ready time, and managing order-prep start time with the slip-logic order management system allows the customer to order when convenient, and pick up when convenient, avoiding extended wait times and making a higher quality menu actually faster for the customer than present fast-food systems and methods. As customers demand higher quality menus, and menus including healthier options, such a system and methods are particularly advantageous to customers and restaurants alike.

Similarly, the present system and processes also provide an advantage over systems and methods that take pre-orders, but provide no dynamic order queuing, production timing, or slip-logic, such that large or slow orders may interfere with expected wait times, and small or fast orders may sit abnormally long before the customer picks them up. Again, the present system and methods also provide an advantage over systems and methods that take pre-orders but, in order to maximize order freshness, require the customer to 'activate' or 'confirm' the order upon reaching the restaurant location, effectively eliminating the advantage of pre-ordering to avoid the wait of order preparation. The present systems and methods, thus, capitalize on the advantages of pre-ordering, rather than effectively putting pre-orders in the same preparation position as if the orders were placed at the window.

Non-Sequential Linear Access

The present disclosure offers multiple advantages over drive-in restaurants with multiple parallel ordering and pick up spaces. Non-sequential customer access to a drive-through window(s) maximizes efficiency of wait staff, preventing the necessity of constantly carrying orders to a plurality of locations. Additionally, non-sequential customer access to a drive-through window(s) maximizes convenience and time savings for customers, eliminating the need to wait at a particular location for the order to be prepared—an especial advantage over restaurants where the customer places and receives the order at the same window or parking space, and has to wait thereat during preparation.

Efficiency

Additionally, the present disclosure offers multiple advantages over order delivery methods in which the customer places an order, and the customer is directed to pull to a parking location and wait for the order to be brought to them. Non-sequential customer access to a drive-through window allows wait staff to work in an efficient manner from inside the building, thereby reducing per-order time and cost, decreasing customer wait time, and preventing inefficiencies and potential dangers (moving vehicles, low-light locations at night, etc.) from requiring wait staff to exit the restaurant repeatedly to carry orders to waiting vehicles. Additionally, pre-placement of an order through a mobile device and/or online ordering system prevents the necessity of the customer waiting for the order to be prepared.

Various combinations of the different elements of embodiments of the disclosure as herein defined will be obvious to those in the art as appropriate for the specific application and environment of use.

System and Method Components

In various embodiments, the present system and methods of use thereof include the following components.

Ordering System

The present disclosure comprises, in various embodiments, a production-timing and slip-logic mobile ordering and order management system. A particularly suitable such system, incorporated in many embodiments herein, is described in patent publication US 2017/0018041 A1, published Jan. 19, 2017, the disclosure of which is incorporated herein by reference for all purposes. Further details regarding the ordering system is provided, as relevant, herein, particularly in relation to the detailed description of the FIGs.

Mobile ordering system, as used herein, is defined as a system that provides customers with the ability to place an order via a mobile device. Mobile device, as used herein, encompasses stationary computers that are able to remotely access the system—such as a desktop personal computer connected to the internet. Some mobile devices herein must be literally mobile—such as carried in a hand, vehicle, about the human body, etc.—as indicated expressly or by context, such as for dynamically tracking customer location. Such mobile devices include smartphones, tablets, laptops and notebooks, smart watches, vehicle-integrated processing and connectivity systems, and other suitable devices.

Non-Sequential Order Pick Up Window

In preferred embodiments herein, a restaurant location comprises at least one non-sequential order pick up window (unless specified otherwise, also referred to herein as "order pick up window," or "pick up window," and sometimes abbreviated when repeatedly used simply as "window"). It should be noted that, as used herein, "order window" is defined as a general term that includes order pick up windows, order payment windows, order placement windows, or any order-related window, unless otherwise indicated explicitly or by context. An order pick-up window is a type of order window.

A non-sequential order pick up window is configured for customers to come to the window and pick up their order in the sequence that the order is ready, and not necessarily in the sequence that the order was placed. In preferred embodiments, the order pick up window is used to deliver orders to customers that have already both placed and paid for their order online (including through a mobile device). In preferred embodiments, the order pick up window does not have a microphone, and does not accept payment for orders. In particularly preferred embodiments, the restaurant location does not have any microphone for customers in the parking lot to communicate with the restaurant staff. In particularly preferred embodiments, there are no sequential queues in the parking lot.

"Non-sequential," as used herein, unless otherwise indicated, is defined as referring to lane, order pick up window, etc. that: (a) is not necessarily entered or approached in the sequence of order placement, or of customer arrival at the restaurant location but, instead, (b) is accessed in the sequence of order pick up, or at least of attempted order pick up by the customer, which is generally and preferably the sequence determined by the intersection of when the orders are ready and when the associated customers arrive. In other words, ideally, a non-sequential lane is entered and a non-sequential order pick up window is approached, for example, when: (a) the customer is present at the location, and (b) an order-ready board (or other order-ready notification system) indicates to the customer that their order is ready for pick up.

Non-sequential queuing spaces or lanes, and non-sequential parking spaces, however, are typically entered when a customer arrives, allowing the customer to wait conveniently for a notification that their order is ready. Such spaces and lanes are still non-sequential in the sense that they do not block other customers from entering the non-sequential drive-through lane or approaching the non-sequential order pick up window, thereby preserving efficient customer flow and reducing or eliminating unnecessary wait time because of sequential, linear queuing.

In some embodiments, no orders are taken at the order pick up window. In some embodiments, orders and payment are received at the order pick up window, but the customer must exit the lane accessing the order pick up window and wait to be notified (such as by the order board) that the order is prepared, before re-approaching the order pick up window. Such embodiments provide service to customers who do not have access to a mobile device, eliminate the need to go inside to place an order (whether for convenience of the customer or because the restaurant has no area inside for receiving orders), while preserving the efficiency of non-sequential access to the order pick up window.

In some embodiments, the restaurant location does not have any microphone for customers to communicate with wait staff. Customers place their orders in various embodiments, through a mobile device, through a web site, inside the store, at a kiosk, with an attendant in the parking lot, or—in relatively limited circumstances—at the order pick up window. Eliminating the microphone allows the restaurant to focus on accurate order preparation instead of trying to accurately hear and interpret customer orders, thereby eliminating a potential source of error. Eliminating the microphone encourages pre-ordering by customers, and the associated advantages discussed herein, including convenience and speed for other customers.

In some embodiments, order-placement stations are provided in the parking lot, inside the restaurant, at other convenient locations (such as a mall, grocery store, retail store, office building, industrial center, bus stop, food park, school, university, conference center, visitor center, travel center, convenience store, etc.). In some embodiments, the order-placement stations are kiosks, staff, or third-party personnel or equipment. In some embodiments, the order-placement stations also accept payment through at least one of: credit cards, debit cards, automated clearing house system, electronic funds transfer, cash, bitcoin, other electronic funds, or some combination thereof. In some embodiments, customers who approach an order-pick up window to place an order are directed to order online, with a mobile device, inside the restaurant, or at an order-placement station.

Order Notifications

In various embodiments, customers are provided with various order notifications through the ordering system, a notification system, an order-ready board (discussed hereafter), etc. In preferred embodiments, customers are provided with notifications on their mobile device, in their vehicle, through short message service (SMS), electronic mail (e-mail), etc. In particularly preferred embodiments, customers are provided with a mobile device notification, an SMS notification, or both, when at least one of the following occurs: their order is within a given time of being ready, or their order is ready. In some embodiments, customers receive a mobile device notification, an SMS notification, or both, when their order is ready.

Order-ready notifications are particularly important to non-sequential order pick up, as it prevents customers from entering the order pick up lane until the precise time their order is ready. This provides increased time convenience for customers, and minimizes the length of customer queues. As discussed elsewhere herein, minimizing the number of customers in a lane at a given time decreases customer wait time, and minimizes required real estate for a restaurant location.

Pre-Ordering and Pre-Arrival Production

In various embodiments herein, the ordering system allows, encourages, or requires, pre-ordering, or placing an order before entering the order pick up lane. In particularly preferred embodiments, the ordering system allows, encourages, or requires offsite (or at least outside of the pick-up lane(s)) placement of orders and payment for orders. Pre-ordering (typically also including pre-payment) allows the restaurant location to begin production before customer arrival, minimizing customer wait time and increasing restaurant and traffic efficiency.

In some embodiments, as discussed further elsewhere herein, a location providing only a non-sequential order pick up window, requiring (or at least highly encouraging) pre-ordering and pre-payment, reduces the amount of parking lot needed, as it can be treated like a pick up window (such as a laundromat) for planning and relevant city code purposes. For example, in one embodiment of a restaurant location serving a high-quality, highly-customizable casual restaurant menu, in a metropolitan area of approximately two hundred seventy-three thousand (273,000) people, anecdotal observation indicates that there are never more than two (2) or three (3) customers in a row at the order pick up window, even at highly busy times.

Furthermore, pre-ordering online, through a mobile device, etc. allows customers to more fully review the menu without time and embarrassment pressures, and to place the order without time and microphone and language or accent constraints. Accordingly, higher levels of customization and drastically reduced order mistakes are simultaneously possible.

Order-Ready Board (Orb)

Many embodiments comprise, or comprise the use of, an order-ready board (ORB) or similar order status display structure for notifying customers when to advance to a non-sequential pick up area. In various embodiments, the ORB is positioned such that it can be viewed when approaching a non-sequential drive-through pick up lane, from queuing parking spaces and/or lanes, and from at least some portions of the parking lot in general. The ORB presents at least the orders which can be picked up, using some form of identification which may be readily discerned by customers. In some embodiments, it alternatively or additionally presents the orders for which customers should approach the pic-up area(s) (preferably at least one window), even if the order is not actually ready yet.

Such an ORB is not a menu, such as display some or all of a restaurant's menu options, and from which customers determine what they are going to order. However, in some embodiments, a single structure combines both at least one each of an ORB and a menu. Conversely, in some embodiments, an ORB does not function as a menu in any capacity, and is not combined with any menu. Furthermore, in various embodiments, the ORB is not connected to a microphone, and so cannot broadcast a verbal announcement of an order number, a customer's name, etc.

In preferred embodiments, the ORB is provided in combination with a means for SMS messaging, mobile device notifications, e-mail, or another form of electronic messaging notification. In such embodiments, the customers may choose to rely primarily on looking at the ORB to know when to advance to the order pick up area(s), may rely primarily on the electronic messaging notification, or some combination thereof. In preferred embodiments, all pending orders are presented on the ORB, and customers are able to verify that their order is in process by looking at the ORB.

In some embodiments, the ORB is configured to protect identity, to combat theft of orders, or both. In some such embodiments, the ORB displays at least one of: an order identification alphanumeric string, a customer-provided 'nickname,' and a customer provided 'order identification' string. Such embodiments do not display a customer's actual name, phone number, or other sensitive information that may be used to breach the customer's security if publicly displayed. In some such embodiments, an additional piece of information, such as a confirmation string, a name, a phone number, or other information associated with the order and/or customer, and not made public on the board, is required before delivery of the order. Such embodiments prevent an order from being stolen by being seen on the ORB by a passerby and then being picked up.

An ORB may also be referred to as an order status display which, in various embodiments, displays orders that are ready, displays the status of all pending orders, or other suitable order status display configurations.

DETAILED DESCRIPTION OF THE DRAWINGS

FIG. 1—Ordering Process

Referring to FIG. 1, representing some exemplary embodiments, the process starts at 102 where customers access a menu of available items. The menu will generally be available on an interactive website or mobile application (app) that can be accessed by customer through his/her mobile device (cell phone, computer tablet, computer, and the like). Customers (guests) can place orders from anywhere—allowing them to plan ahead and pick up later. This allows other occupants in a vehicle to place the pick-up order while the vehicle is moving towards the restaurant. The menu display also includes means for the customer to indicate the desired pick up wait time ((for example: as soon as possible (ASAP), 10 minutes, tomorrow, etc.)).

FIGS. 2A-2D—Order System Screens

Figure 2B:
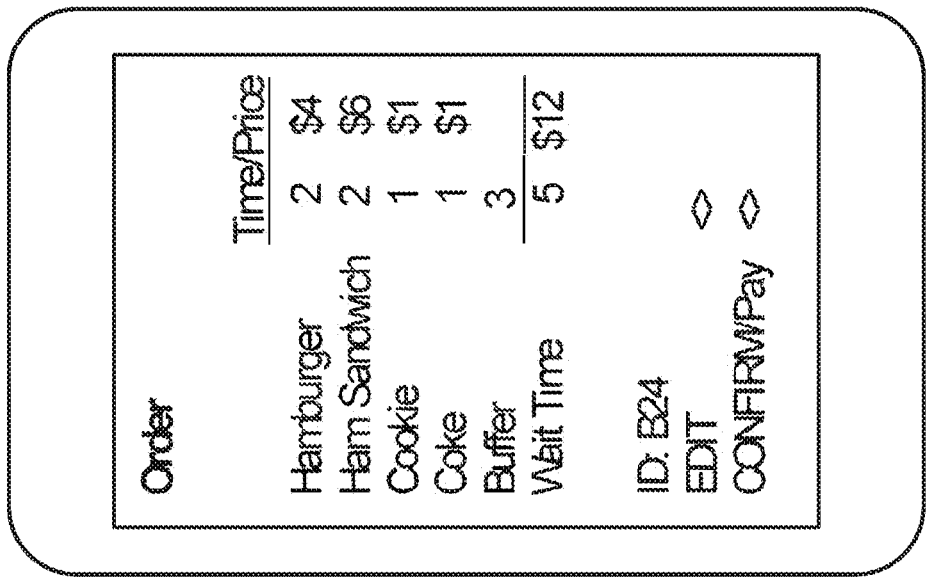
FIG. 2B is a schematic view of a possible mobile device display of an embodiment of the present disclosure after editing an order.
Figure 2A:
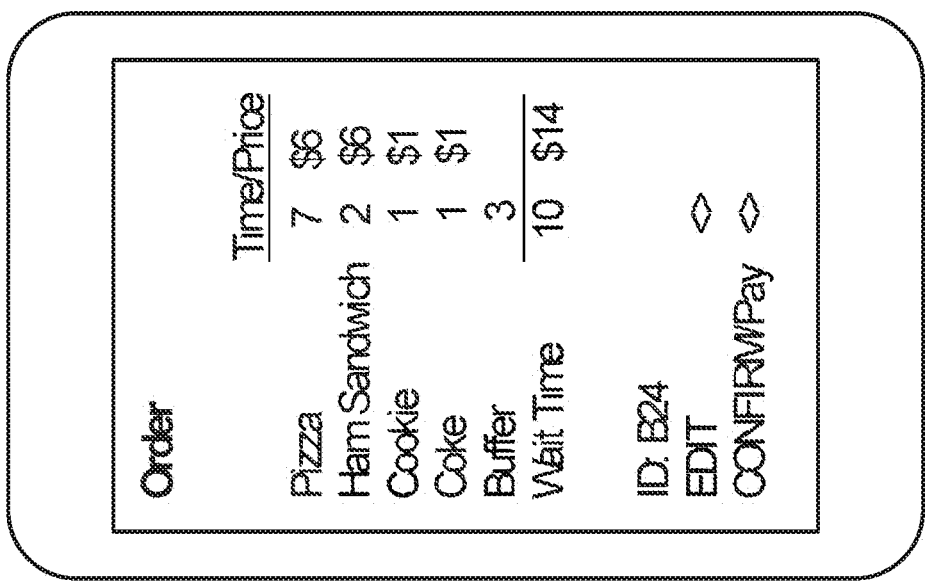
FIG. 2A is a schematic view of a possible mobile device display of an embodiment of the present disclosure before editing an order.

In various embodiments, shown in FIGS. 2A-2D, when the customer accesses the menu a customer identification (ID) is generated by a data processing unit, or the customer uses an existing unique ID number or code. When the customer selects items from the menu for orders that are wanted ASAP, there is generated and displayed on the customer's mobile device or computer the menu items selected, the price and the preparation time for each item, and the preparation time plus indicated wait time, as illustrated in FIG. 2A and FIG. 2B. Thus, the customer can see (104 display on customer's mobile device, see also FIG. 2A—or appropriate computer screen) if the preparation for one or more items is excessive for his or her needs and can edit the order accordingly. The system data processor(s) will calculate all the variables.

If a particular item on the order could be deleted and allow the order to be produced more quickly, then the system will highlight that item and inform the customer how much time could be "saved" by not ordering that particular item. If no item can be deleted to save preparation time, then no indication will be displayed. The display may also display an appropriate message such as "Your Order's Wait Time will be X minutes. To shorten your Wait Time, remove the highlighted item(s) below."

The display may also show "Promised Time." For example, preparation time for pizza may be 7 minutes, and all other items (drinks, sandwiches, bagged chips, and the like) only 1-2 minutes, as illustrated in an example mobile device display in FIG. 2A. Thus, the customer may edit the order, for example, delete pizza, and select another item with shorter preparation time (see 106 to 102 of FIG. 1), such as is shown in FIG. 2B, where pizza is deleted and hamburger is selected.

Figure 2D:
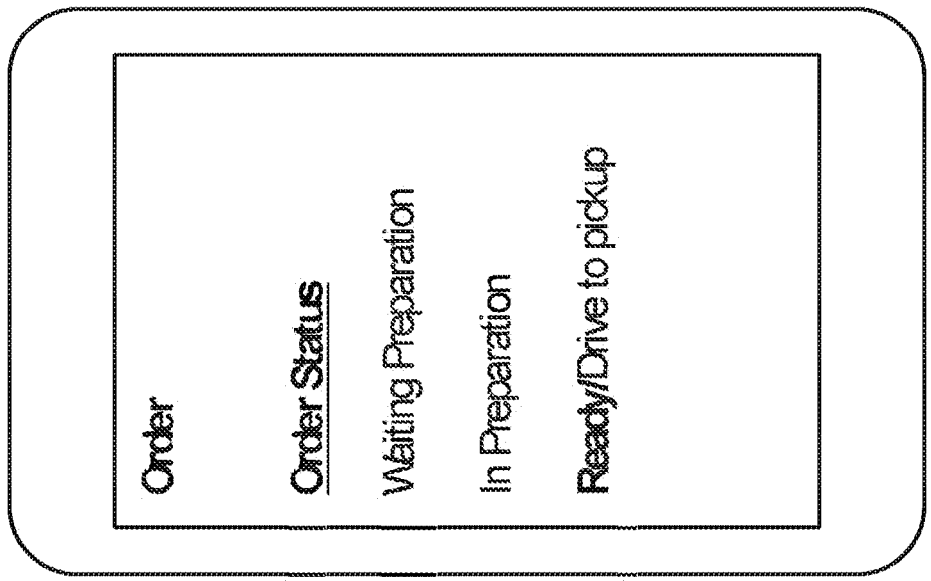
FIG. 2D is a schematic view of a possible mobile device display of an embodiment of the present disclosure showing status of an order.
Figure 2C:
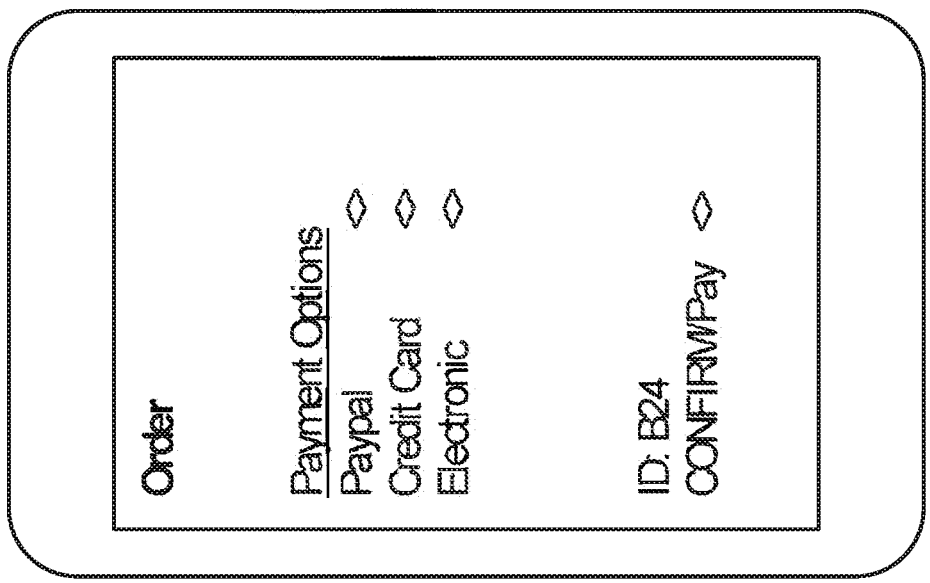
FIG. 2C is a schematic view of a possible mobile device display of an embodiment of the present disclosure showing payment options.

The order is confirmed or edited. If edited (as illustrated on FIG. 2B) it may then be confirmed. When confirmed, 106 (decision connector) to 108 (customer payment module), the order and cost is displayed (FIG. 2C) and the customer is asked to make required payment, as illustrated in FIG. 2C. The order status will be periodically or continuously updated (FIG. 2D). There will also be an indication on the customer's device screen that the "order is ready." For future planned orders where a customer selects a specific time slot and day, the system will determine whether or not the order can be produced (and delivered) by the time requested, and inform the customer on its device screen. No production times will be displayed.

When the customer selects items from the menu, there is generated and displayed on the Customer's mobile device or computer the menu items selected, the price and the indicated total wait time. Also displayed next to any one item in the order is the amount of wait time that could be removed from the total wait time by removing that one item (which has a longer production time associated with it) from the order. Thus, the customer can see (104 display on customer's mobile device, FIG. 2A) if the preparation for one or more items is excessive for his or her needs and can edit the order accordingly. For future "planned" orders the customer selects a specific time slot and day. The system will determine whether or not the order can be produced (and delivered on time) by the time requested. In this scenario, no production times will be displayed because they do not matter.

As noted above there is also provided means, in some embodiments, for customers to enter a unique customer ID number or code upon placing an order (for example, to create an account).

This identification number or code will facilitate speedier service and allow identification of repeat and frequent customers. Customer's payment types, past orders and favorites are remembered by the system, thus, making reorder quicker and more convenient compared to traditional drive through windows.

The wait time for as soon as possible (ASAP) orders and time slots allowed for future orders is based on an algorithm that factors multiple variables. Variables include (but are not limited to):
 a. ASAP or promised time(s) of prior orders and the current production progress of each of
 those prior orders
 b. Order size
 c. Order item complexity
 d. Production staff levels
 e. Delivery staff levels
 f. Skill levels of staff members
 g. Delivery distance of prior and current orders The system, with a customer identification, is programed in some embodiments to allow frequent, loyal, "very important person" (VIP) guests to jump ahead of the line and for their order to receive preferential timing. The system is also, in some embodiments, configured to allow guests to pay an extra fee to receive their order quicker. It also allows, in some embodiments, for a "Free if Late" promotion, other promotions, or some combination thereof. The system contains a management tool for measuring and tracking promised times versus actual fulfilled delivery and pick up times.

In preferred embodiments, only electronic payment from a customer's mobile or computer device connected by the internet (or other distributive computing method or connectivity method) is accepted as payment. There are many mobile payment systems available and more are being developed all the time. These include Square Wallet, virtual prepaid cards, Google Pay, Apple Wallet, Android Pay, Dwolla, and the like. In some embodiments, there is provided a kiosk at the restaurant location for payment by credit card, cash, other payment means, or combinations thereof. Also, in some embodiments, there is provided a customer service representative (order taker) in the location parking lot that will have a mobile device for taking orders and payments.

In addition to displaying the menu or ordered items there is provided, in some embodiments, an interactive sensor (usually a button) on the menu display on the customer's mobile device or computer that will allow nutritional information for the menu or ordered items to be displayed. The nutritional information also contains, in some such embodiments, various diet "points," such as used by diet services as, for example, Weight Watchers™, Jenny Craig™ NutriSystem™, and the like. The information is stored in data storage in the Data Processing Unit or other suitable accessible data storage, and is accessed by the appropriate computer program of the computer system.

Kitchen orders are prepared by the preparation staff in parallel, not necessarily in linear sequence, as determined and arranged by an algorithm of the data processing unit. The system algorithm determines which order to make next and dictates promised completion times. Simple orders and preferred guests' orders are moved forward in progression. Multiple orders are worked simultaneously. When orders are complete, the customer is notified and the order preparation algorithm is updated to calculate a new preparation display for the preparation kitchen staff.

When the order is ready the customer is notified (112) (FIG. 2D) by visual display (FIG. 2D) or text message on his/her mobile device or computer, or by any other suitable means, and the customer moves to an order pick up window, 120. An order placed for delivery also receives a text message on his/her mobile device or computer, or by any other suitable means, to notify them that a delivery driver has departed from the restaurant with their order and gives them an updated arrival time based on current traffic conditions available on various internet sites. Thus, there is no sequential waiting for order pick up: the order is picked up when ready and, since the order is prepaid, no wait is necessary for payment and change making. This is facilitated by the arrangement of the location physical layout explained in more detail below.

The data processing unit or module, 110, is the computing and data generation heart of the system. It contains suitable data storage capacity for menu items, prices, preparation time, customer identification, order details, payment details and the like. It is capable of computing preparation wait time and pre-preparation times from inputted and stored data and causing the resulting information to be displayed on customers' devices and display panels (116), for customers and preparation personnel.

The data processing unit and associated data storage will suitably be a computer programed and running software to perform the functions described. Implementation of such a data processing system is well within the capabilities of those skilled in the art.

Figure 3:
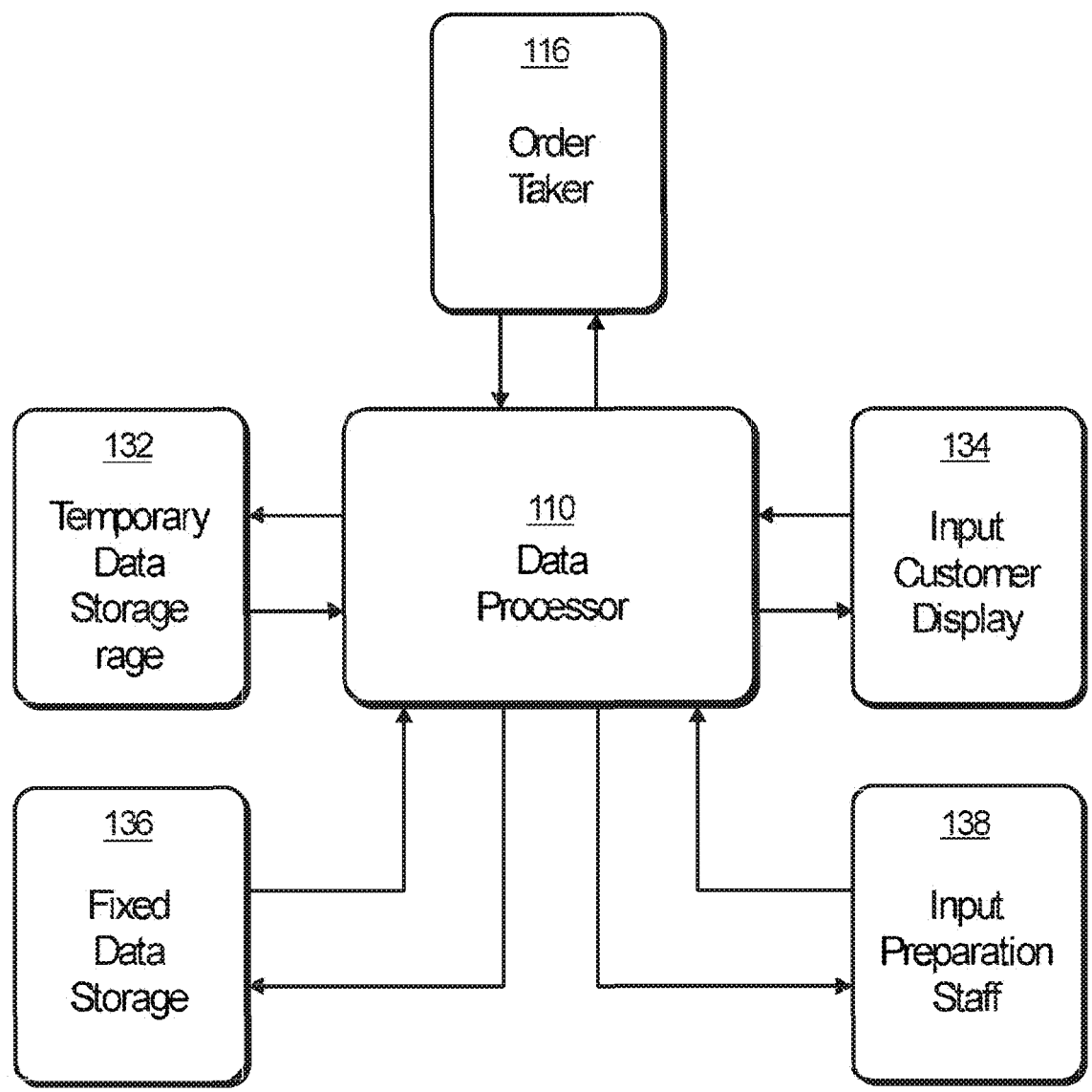
FIG. 3 is a flow diagram of the process showing data flow in a data processing unit.

FIG. 3—Ordering System

Referring to FIG. 3, representing various embodiments, there is a flow process diagram of functions of the data processing unit. FIG. 3, 110 is the computing data processing unit of the system. It will receive or access data from 136 fixed data storage and write to the data storage system. The data, such as menu items, prices, preparation time, and the like, are "fixed" in the sense that they are not immediately variable.

The system will have a mechanism allowing a manager to log in and mark any item, such as "Sold Out," so that customers cannot continue ordering an item no longer in stock. The data may be updated as often as needed and there are means for updating the data. This management or administrative unit allows for input, for changes in data storage, and for receiving data output (see FIG. 5). Temporary, calculated, and intermediate calculation values are stored in data storage unit 132, and can be accessed and written to by the data processing unit, 110. For example, the preparation time is affected by staff levels and skill levels in the algorithm.

Customer input is from 134 and includes ordered item, edits, delay or requested wait time, and the like. Order taker(s) (116) provides input/output. These staff members may be located at a call center, or in a restaurant, and will take orders by phone from customers and enter into the system.

They may be assigned to roam the parking lot of a restaurant location and take orders from customers in cars. Input from the preparation staff is shown as 138, and includes start time, order ready information and may include continuous update of order status.

There is also provided means for the Preparation Staff and order administration/management to input data on orders that are being processed. These will include, in some embodiments, individual computer tablets, or equivalent or larger display panels, that will have data on customer ID, ordered item, requested delay time, and calculated preparation order sequence. In some embodiments it is not expedient for the preparation staff to use touch or keyboard inputs, but foot operated input devices are suitable. Voice control input to suitable receivers are preferable in some embodiments. There an abundance and variety of voice activated/control technology available which can easily be adapted for use in the system of the disclosure.

The data processor unit will calculate the needed information and send it to the appropriate location. In general, communication for the data processing unit to customer's display and preparation staff will be wireless. The data processing unit and data storage may be a dedicated system or operated by remote shared distributive computing ("the cloud"). A cloud system will generally be preferred.

FIG. 4—Parking Lot

Figure 4:
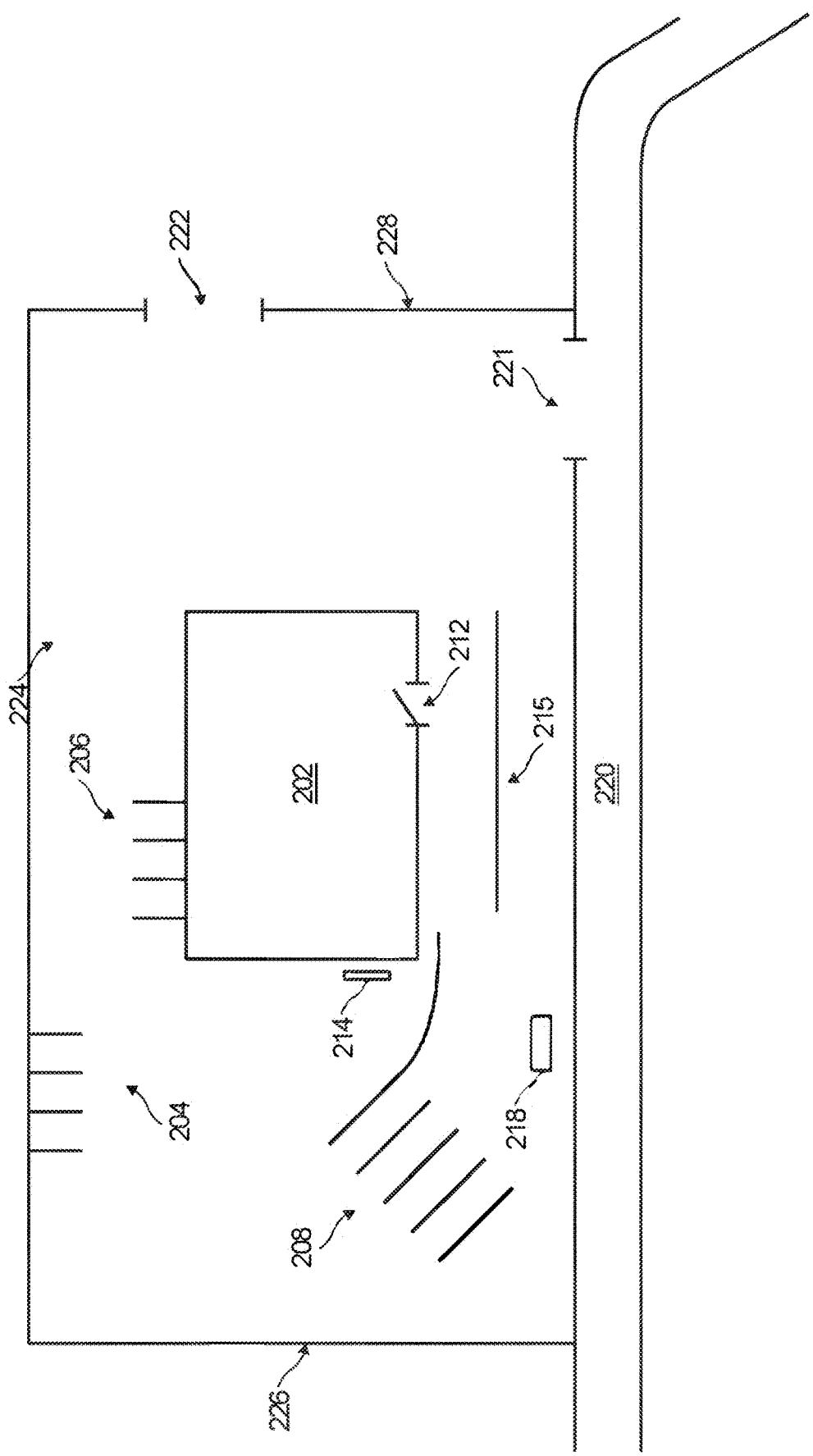
FIG. 4 is a schematic representation of a restaurant building and parking layout for an embodiment of the present disclosure.

Referring to FIG. 4, which is an illustrative restaurant/lot arrangement of an embodiment of the disclosure, 202 is a restaurant building, 212 is an order pick up window, 204 and 206 are customary parking spaces, and 208 is a plurality of non-sequential parallel single vehicle parking spaces for cars placing orders and awaiting order ready notification. An access road 220 has lot entrances 221 and 222. The side by side non-sequential single vehicle parking spaces, with access to a non-sequential drive through lane 215 leading to the non-sequential pick-up window 212, allows customers to: a) not feel rushed when placing an order because no car is behind their vehicle waiting to order; and b) proceed to the pick-up window immediately when their order is indicated as ready without the potential wait that can be caused in a traditional drive-through by other customer's queued vehicles in front of them awaiting their orders' production and completion. This can greatly reduce waiting time and improve the ordering experience. Having payment prior to pick up also reduces wait time and makes the entire process more efficient. The prior payment, in some embodiments, may also help to facilitate payment for dine-in guests, who can reduce time spent in parking lot spaces. Items 224, 226 and 228 are lot perimeters. Item 214 is an ORB, used in some embodiments and not in others, for displaying customers order ready information. Item 218 is a payment kiosk provided only in some embodiments.

Customers (guests) may enter the lot and park in the customary parking spaces, or in the non-sequential single vehicle slanted spaces, as they desire. Menus are displayed on customer's mobile devices, or computers through the internet or other suitable distributive computing/communication system, and orders are made and processed when customers are at any location. In preferred embodiments, orders are entered before the guest enters the parking lot, scheduled for times in the future, etc. Customers wanting immediate, "as soon as possible" (ASAP), service will generally be located in the parking lot, be prepared to depart their current location for the restaurant, or be headed towards the restaurant lot. The most expedient location will be the slanted non-sequence single vehicle spaces 208. Customer without the ability to pay by mobile device may, in some embodiments, drive by the optional kiosk 218 and pay with cash or credit card or, in some embodiments, may pay via an optional attendant that roams the parking lot to take orders and payment. There is no provision for payment at the order pick up window.

Figure 5:
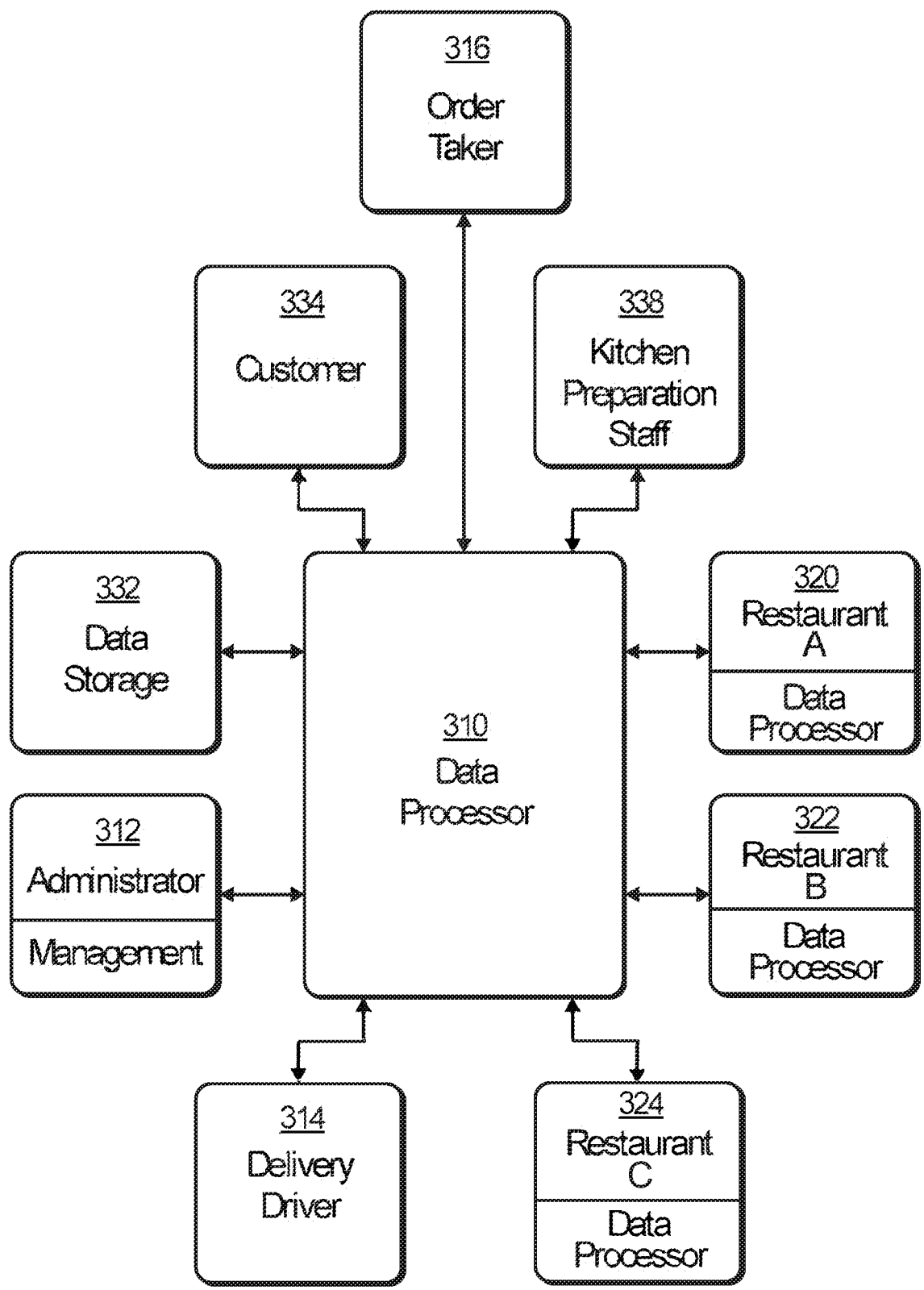
FIG. 5 is a flow diagram of the process of an embodiment of the present disclosure.

FIG. 5—Multi-Location System

The system, in various embodiments, interconnects more than one restaurant (store) unit into a combined system and connects to the data processing unit with a complete feedback loop to and from each restaurant to provide information of all orders to each location. An embodiment of such a system is illustrated in the flow diagram of FIG. 5. This information is updated when every order in progress is noted as complete.

This multi-location system allows routing of order preparation to the most efficient location, where possible. It is especially helpful for scheduling and preparing pre-scheduled and delivery orders. Each restaurant unit, 320, 322 and 324, will have its own server (data processor) that will be able to communicate with the central data processor 310. The order data starts off on the server (data processor) hosting the website, ordering system, or application, and is then passed to the appropriate store server. One unique feature is that the system data processors are then passing data back and forth at least to the system website or applications to update the "overall order queue" timing of current orders.

Each restaurant unit, 320, 322 and 324, has the ability to adjust certain timing variables based on current in-unit conditions to increase or decrease wait times displayed to guests currently ordering. The system will access in-unit schedules and staff positions and skill levels to determine team's productive capacity at any given time interval on any given day. The management display and input unit, 312 is connected to the data processing unit, 310, to allow administrative input and to be able to obtain real time and calculated information of the operations. Inputs include, pricing, staff level at each location, order status, particularly prescheduled and delivery orders, etc. The system also allows for delivery drivers, 314, to be re-routed from one store pick up location to another store pick up location by a central logistics control mechanism factoring in variables to shorten the overall wait time for customers, 334.

Manager(s) can login and update the system to current staff levels and in store conditions so that adjustments to timing are made; for example, sick staff members, delivery driver in vehicle accident, etc. The system will also allow managers, 312, to manually increase or decrease wait timing to slow or speed up order inflow. The system will supply data from future guest orders (for tomorrow, two days out, etc.) to kitchen/bakery production software and vendor inventory ordering software to help better prepare product quantities for future work dates. FIG. 5 illustrates the system having multiple stores interconnected. The data processing unit 310 and data storage units 332 are central (on-site or cloud). The data processing unit receives inputs and provides data and output to each of the interconnected restaurants A (320), B (322) and C (324). It can receive and provide data (directions etc.) to a delivery driver (or drone) and provide order information to Kitchen preparation staff, 338, and to the Administration unit 312.

Order taker(s) are also an optional input/output source, 316. These staff members may be located at a call center or in a restaurant, and will take orders via phone, chat, etc. from customers, 334, and enter the orders into the system. They will also roam the parking lot and take orders from customers in cars. This will allow orders by those customers who do not wish to use their own mobile devices. It will also allow better customization of future orders, as the order takers will be able to gather and input to the system identification data such as the customer's name, phone number, credit card number, automobile license plate number and the like to make the ordering process more convenient for guests.

For example, the customer's vehicle license plate number is saved to the guest's user profile so that staff members will know the guest's name, have stored payment information tied to the account, see the guest's favorites, past orders, etc. as they approach the guest's car. This should make the ordering experience more convenient for the guest. With payment types stored to the user profile, on return visits in the same car, guests will not need to physically provide their credit card. In some embodiments, the restaurant location is provided with at least one license plate reader, camera, or similar technology, to allow restaurant staff, the ordering system, or both to identify the customer or customer's vehicle before the customer arrives at the order pick up window.

In some embodiments the disclosure is a system and process for managing and scheduling an order in a restaurant with both pick up business and delivery business. Scheduling take-out orders and delivery orders in the same preparation location (kitchen) is made more efficient while reducing wait time on pick up orders. This management process works basically the same as for pick up orders, except that driver pick up, driver time availability, and various orders' delivery locations proximity to each other will be taken into account in the data process unit to determine the scheduling of preparation and calculate delivery time. This allows proximate orders to be clustered with one driver to speed up overall times. Driver location and arrival time will be displayed on the delivery customer's computer or device in the same manner as for pick up customers.

Figure 6:
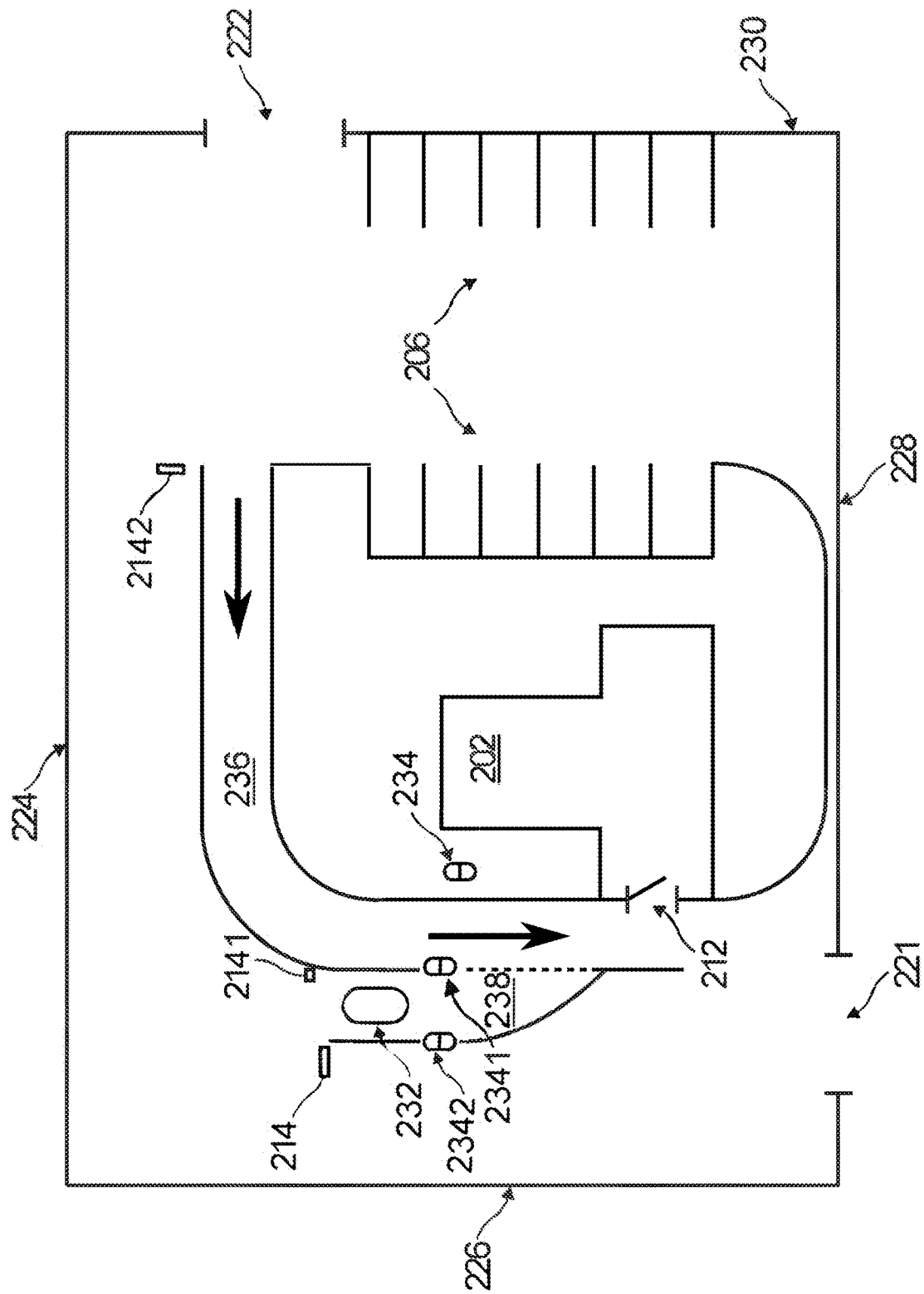
FIG. 6 is a schematic representation of a restaurant building and parking layout for an embodiment of the present disclosure.

FIG. 6—Another Parking Lot

Referring to FIG. 6, which is an illustrative restaurant/lot arrangement of an embodiment of the disclosure, 202 is a restaurant building, 212 is an order pick up window, and 206 is customary parking spaces. The restaurant is, in some embodiments, a traditional restaurant with a sequential drive-through order lane 236, such as at a menu board with a microphone (not shown), with an additional non-sequential drive-through pick up-only lane 238 accessing a single order pick up window 212. In some embodiments, payments are accepted at window 212. In other embodiments, payment is not accepted at window 212.

Customers enter by lot entrance 222 and leave by lot exit 221. In some embodiments, side by side, non-sequential, single vehicle parking spaces (not shown), with access to the non-sequential drive through lane 238 leading to the pick-up window 212. Items 224, 226, 228, and 230 are lot perimeters. Item 214 is an ORB for displaying customers' order ready information. Item 2141 is an ORB that is narrower, and vertically-oriented, used alternatively or additionally in some embodiments. Item 2142 is an alternate ORB location used additionally or alternatively in some embodiments.

Pre-order customers (guests) may enter the lot and park in the customary parking spaces, or the non-sequential single vehicle slanted spaces (not shown), if provided, as they desire. Menus are displayed on customer's mobile devices, computers through the internet, or other suitable distributive computing/communication system. Pre-orders are made and processed when customers are at any location. In preferred embodiments, pre-orders are entered before the guest enters the parking lot, scheduled for times in the future, etc. Customers wanting immediate, ASAP, service when pre-ordering will generally be located in the parking lot, be prepared to depart their current location for the restaurant, or be headed towards the restaurant lot.

Customers who wish to drive through and have not pre-ordered, and do not wish to place mobile or online orders, are referred to herein as order-in-line customers. Such customers will enter sequential drive-through lane 236, and will typically place their order at a microphone-equipped menu board (not shown), previous to stop-go light 234, 2341, or 2342. Stop-go light 234 indicates to order-in-line customers whether they may proceed in the drive-through lane 236 to the order pick up window 212. Stop-go light 2341 is alternatively or additionally used in some embodiments.

Pre-order customers will enter non-sequential drive-through lane 238, preferably when their order is ready, as seen on at least one ORB (214, 2141, 2142, or some combination thereof).

Customer presence detector 232 detects when a vehicle is present in lane 238, and staff inside restaurant location 202 are notified. In some embodiments, stop-go light 2342, stop-go light 2341, or both, indicate to non-sequential pre-order customers whether to merge in to lane 236 and approach the order pick up window 212. In some embodiments, wait staff are also provided with customer identification, as discussed elsewhere herein—such as a license plate reader, notification from the customer's mobile device, etc.—in order to have the appropriate order already located and waiting at the window.

Pre-order customers without the ability to pay by mobile device may, in some embodiments, pay at the order pick up window, similar to sequential order-in-line customers.

FIG. 7—Synchronized Pre-Order Method

Referring to FIG. 7, which shows a method 700 for synchronized pre-ordered item preparation at dine-in locations. The method 700 may be implemented as computer instructions stored on one or more memory devices and executed by one or more processing devices. As shown in FIG. 7, method 700 beings at step 702. At step 702, an interactive menu and ordering information is provided to a customer. The interactive menu displays menu information available at a dine-in location. In some embodiments, the interactive menu may be displayed using a mobile application on the customer's mobile device. In certain exemplary embodiments, while the interactive menu is displayed on a singular customer device, there are multiple customers that are placing an order off of the interactive menu. Additionally, in some embodiments, the interactive menu and ordering information provided at step 702 may constitute a display that is identical to the display provided at a dine-in restaurant. For example, the interactive menu that is displayed at step 702 can list the same drinks, food listings, entrees, appetizers, desserts, and combinations thereof that are provided to sit-down customers at the dine-in restaurant.

At step 704, a provisional input is received from the customer. The provisional input may, in some embodiments, include one or more menu selections, and real-time telematics information of the customer. For example, the provisional input may include real-time telematics information based on a global position of the customer's device and current driving information. In some embodiments, the real-time telematics information can function to display the current and planned driving locations of the customer. In some embodiments, the current driving information includes at least one of local traffic reports, standard traffic conditions, road structures, location, destination, route, and combinations thereof. Moreover, in some embodiments, the provisional input can further include payment information of the customer. In other embodiments, the provisional input may not include specific payment credentials from the customer, but may still include a selection from the customer to pay for the order at the dine-in location. In certain embodiments, the provisional input may include selection of the type of seating or table that the customer would like to dine at in the restaurant. For example, the provisional input may include customer table preferences, such as position of table, booth seating, chair seating, bar seating, outdoor seating, or a combination thereof. Moreover, in these embodiments, the provisional input can include the selection of a particular table based on the customer table preferences and the available tables at the dine-in location, which would allow the customer to know the table location prior to arrival and head directly to the appropriate table.

At step 706, an arrival time of the customer to the dine-in location is determined. This determination is responsive to receiving the provisional input from the customer device. Following, at step 708, the arrival time of the customer and the one or more menu selections to the dine-in location are transmitted.

At step 710, the method 700 continues through optimizing an order completion time based on the real-time telematics and the arrival time of the customer to the dine-in location. For method 700, the method may additionally include dynamically repeating at least one of steps 702 through 710 responsive to an update of the provisional input from the customer. Such an update of the provisional input may include a change to the arrival time, the order selection from the interactive menu, or the payment credentials. Moreover, the provisional input may be updated based on changes to current driving information.

In some embodiments, the method 700 may additionally include a step of obtaining a set of production timing and slip logic (PTSL) rules for generating a dynamic preparation order as a function of PTSL inputs. The PTSL inputs can include, for example, the one or more menu selections, a current dine-in queue, configurable variables comprising a cook time for each of the one or more menu selections, and the real-time telematics information of the customer. In certain embodiments of the disclosure, the method 700 may additionally include a step in which the PTSL rules are applied to facilitate step 710. For example, the additional step may include applying the PTSL rules to optimize the order completion time and generate an order fire time, where the order fire time is set to end at order completion time.

Further, in some embodiments, method 700 may continue through a display, at the dine-in restaurant location, of the order completion time and the arrival time of the customer. For example, this display may be presented to the employees at the dine-in location, in the kitchen of the dine-in location for all staff to view, or to customers that enter into the dine-in location. Moreover, in certain embodiments, in response to displaying the order completion time and the arrival time of the customer, the kitchen staff or restaurant employees may provide a completed order. For example, the provision of a completed order may include providing at least one of the one or more menu selections to a table in the dine-in location. In such an exemplary situation, the table may be reserved for the customer or customers. In some embodiments, the customer may already know the particular table that is reserved based on the customer's preferences. Following, the customers may arrive at their reserved table and eat the order in a similar fashion to a traditional dine-in restaurant experience.

FIG. 8A-D—Pre-Order Mobile Display Screens

In various embodiments, shown in FIGS. 8A-D, when the customer accesses the menu a customer identification (ID) is generated by a data processing unit (e.g., processing device), or the customer uses an existing unique ID number or code. When the customer selects items from the menu for orders that are wanted for dine-in purposes, there is generated and displayed on the customer's mobile device or computer the menu items selected, the price for each item, and the option to set a drive to the dine-in restaurant, as illustrated in FIG. 2A. Thus, the customer can see (104 display on customer's mobile device, see also FIG. 8A- or appropriate computer screen) which menu items to expect when arriving at the dine-in location and can edit the order accordingly. The system data processor(s) will calculate all the variables.

After selecting to "SET DRIVE" the real-time telematics of the customer device will be taken by a provisional input. If the estimated drive time is less than the amount of time that it takes to prepare an item, then the display may also display an appropriate message such as "Your Order's Wait Time will be X minutes. To shorten your Wait Time, remove the highlighted item(s) below."

Figure 8A:
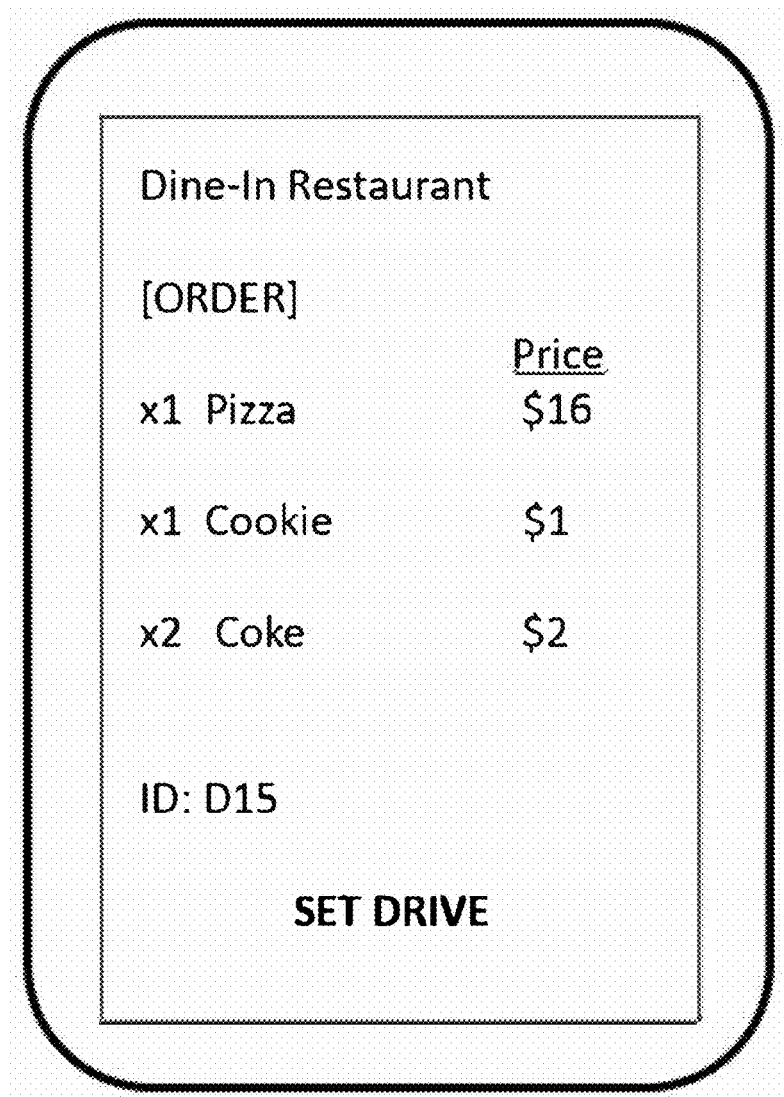
FIG. 8A is a schematic view of a possible mobile device display of an embodiment of the present disclosure before placing an order.

Thus, the customer may edit the order, for example, delete pizza, and select another item with shorter preparation time (see 106 to 102 of FIG. 1, which may be used in conjunction with the screen of FIG. 8A).

Figure 8B:
FIG. 8B is a schematic view of a possible mobile device display of an embodiment of the present disclosure after placing an order.
Figure 8C:
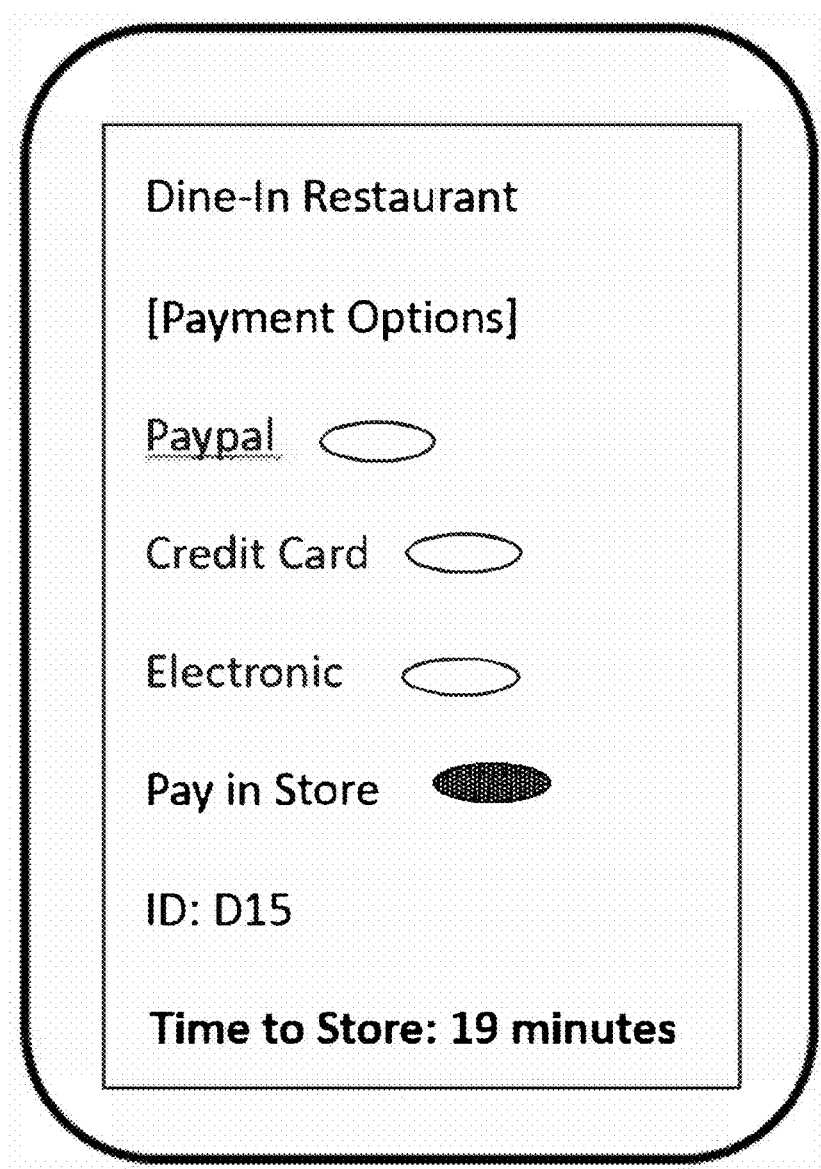
FIG. 8C is a schematic view of a possible mobile device display of an embodiment of the present disclosure showing payment options.

As illustrated on FIG. 8B, once the drive is set and at least a first provisional input has been sent to the restaurant, the directions and arrival time may be shown on the screen. Moreover, the provisional input may be changed through a selection to edited (as illustrated on FIG. 8B). In some embodiments, if the customer selections a payment option, the customer is asked to make required payment, as illustrated in FIG. 8C. In such an embodiment, the customer may be able to select options for payment using their mobile device or may select to pay at the store.

In preferred embodiments, only electronic payment from a customer's mobile or computer device connected by the internet (or other distributive computing method or connectivity method) is accepted as payment. There are many mobile payment systems available and more are being developed all the time. These include Square Wallet, virtual prepaid cards, Google Pay, Apple Wallet, Android Pay, Dwolla, and the like. In some embodiments, there is provided a kiosk at the restaurant location for payment by credit card, cash, other payment means, or combinations thereof. Also, in some embodiments, there is provided a customer service representative (order taker) in the location parking lot that will have a mobile device for taking orders and payments.

Figure 8D:
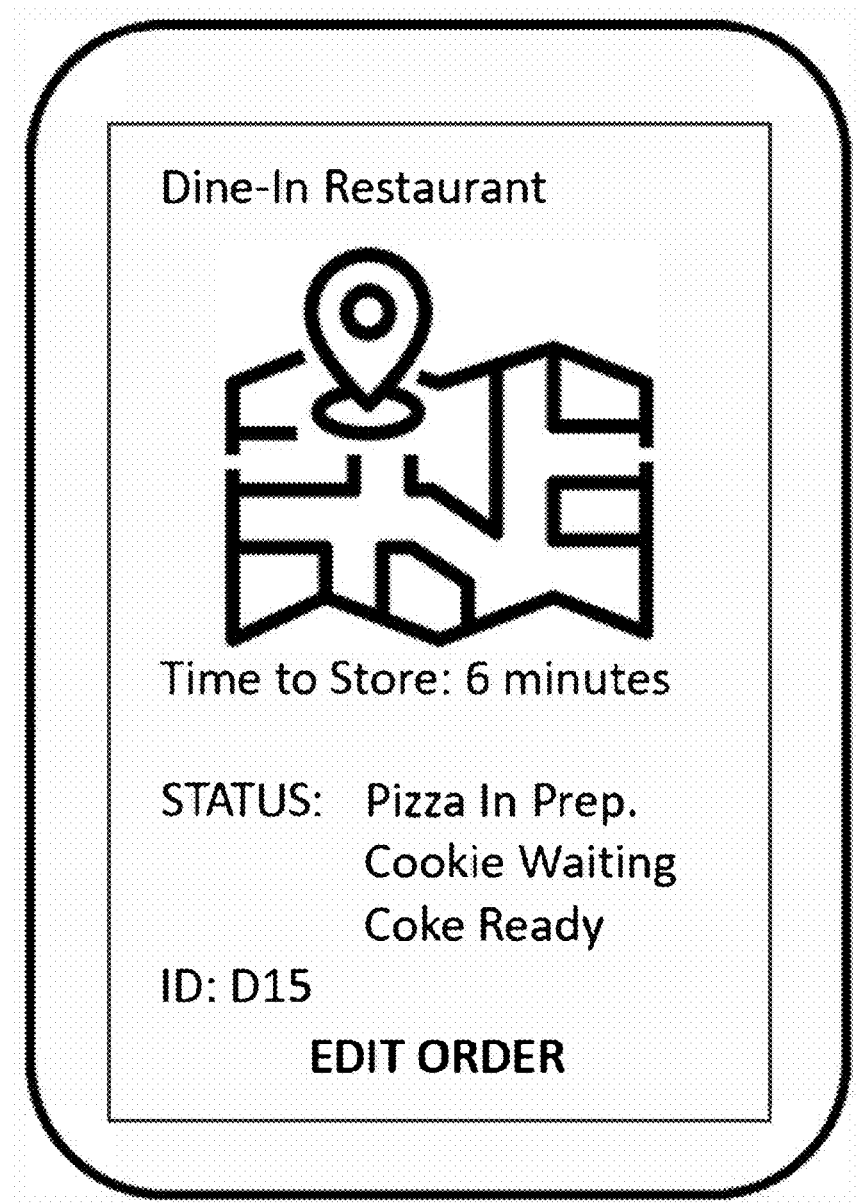
FIG. 8D is a schematic view of a possible mobile device display of an embodiment of the present disclosure showing status of an order.

As the customer proceeds to the store, in some embodiments, the screen may detail certain real-time telematics information, including the time remaining until the dine-in location is reached (as shown in FIG. 8D). Moreover, as shown in FIG. 8D, in certain embodiments the screen may display the status of each item that has been ordered by the customer.

Utilizing the systems displayed, kitchen orders may be prepared by the preparation staff in parallel, not necessarily in linear sequence, as determined and arranged by an algorithm of the data processing unit. The system algorithm determines which order to make next based upon the real-time telematics information of the customer. Simple orders and preferred guests' orders are moved forward in progression. Multiple orders may be worked simultaneously.

The data processing unit or module for this dine-in system, shown as 1100, is the computing and data generation heart of the system. It contains suitable data storage capacity for menu items, prices, preparation time, customer identification, order details, payment details and the like. It is capable of computing preparation wait time and pre-preparation times from inputted and stored data and causing the resulting information to be displayed on customers' devices and display panels, for customers and preparation personnel.

The data processing unit and associated data storage will suitably be a computer programed and running software to perform the functions described. Implementation of such a data processing system is well within the capabilities of those skilled in the art.

FIG. 9A-D—Restaurant Visual Display Screens

In various embodiments, shown in FIGS. 9A-9D, the dine-in location can utilize displays that present the information collected and determined by a system for synchronized pre-ordered item preparation at dine-in locations.

Figure 9A:
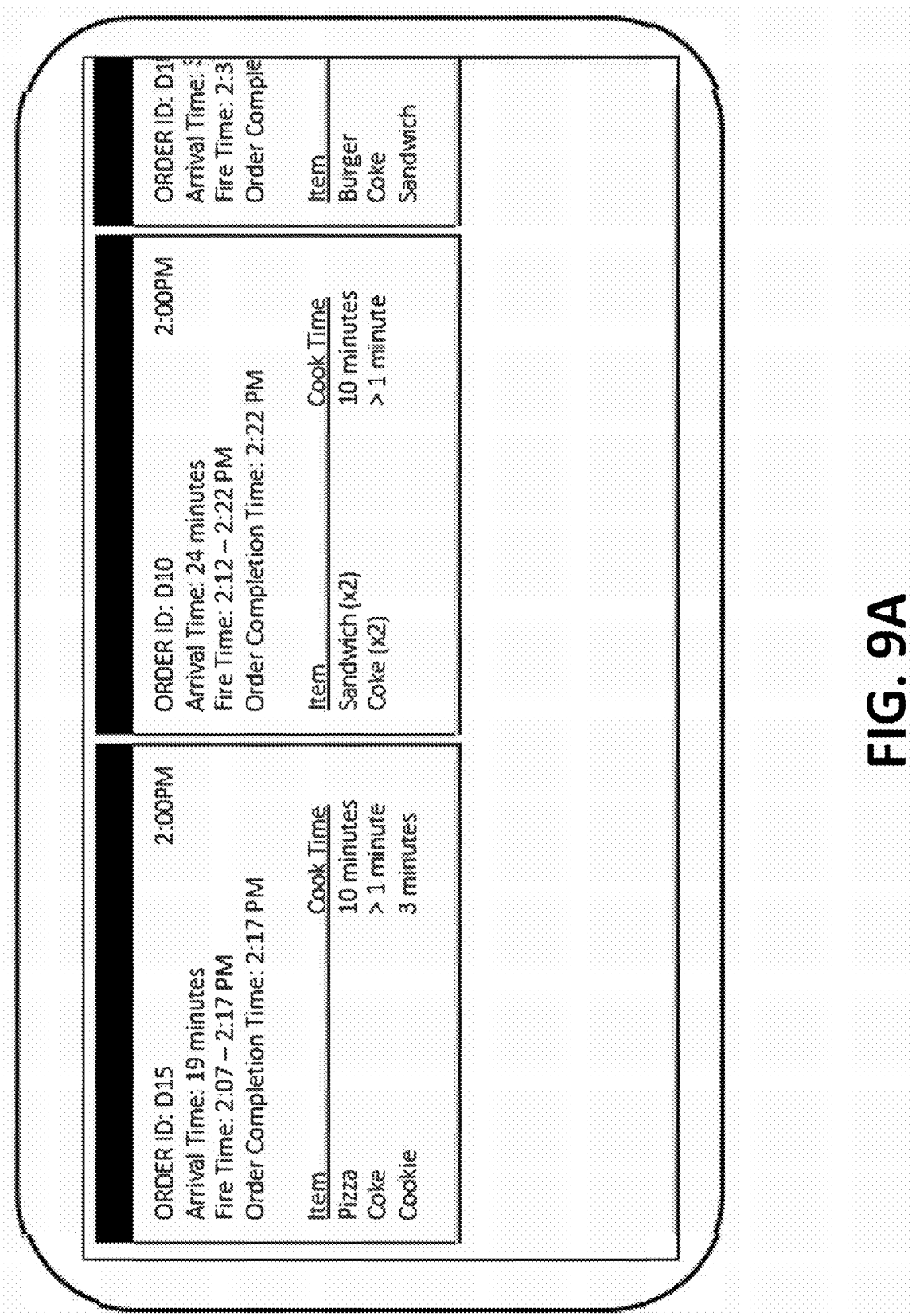
FIG. 9A is a schematic view of a possible visual display in the restaurant of an embodiment of the present disclosure after an order has been placed on a mobile device.

As shown in FIG. 9A, at the dine-in restaurant location, a screen can be present to display information to the restaurant employees—including cooks, employees, and wait staff—that allows for synchronized pre-ordered item preparation. In some embodiments, the screen may list the orders that are currently received from dine-in customers. These dine-in customers may include customers physically present within the dine-in location or those utilizing a method and system that operate off mobile applications, such as the displays shown in FIGS. 8A-8D. For dine-in customers that are pre-ordering and not yet physically present at the dine-in location, the screen, in certain embodiments, can include information such as the arrival time of the customer, the fire time of the order, the order completion time, the current time, and the items that have been order, as shown in FIG. 9A. Additionally, as displayed as an exemplary embodiment in FIG. 9A, the orders may be listed as a queue that is sequenced with the earliest order fire time being displayed first in the queue.

Figure 9C:
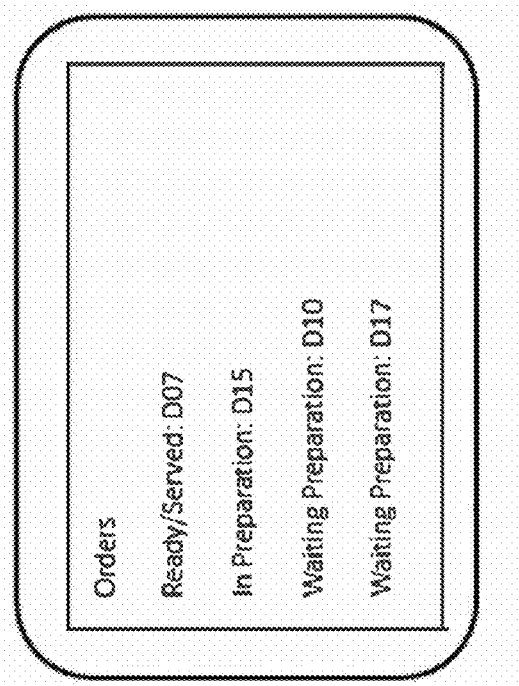
FIG. 9C is a schematic view of a possible visual display in the restaurant of an embodiment of the present disclosure showing status of an order.
Figure 9D:
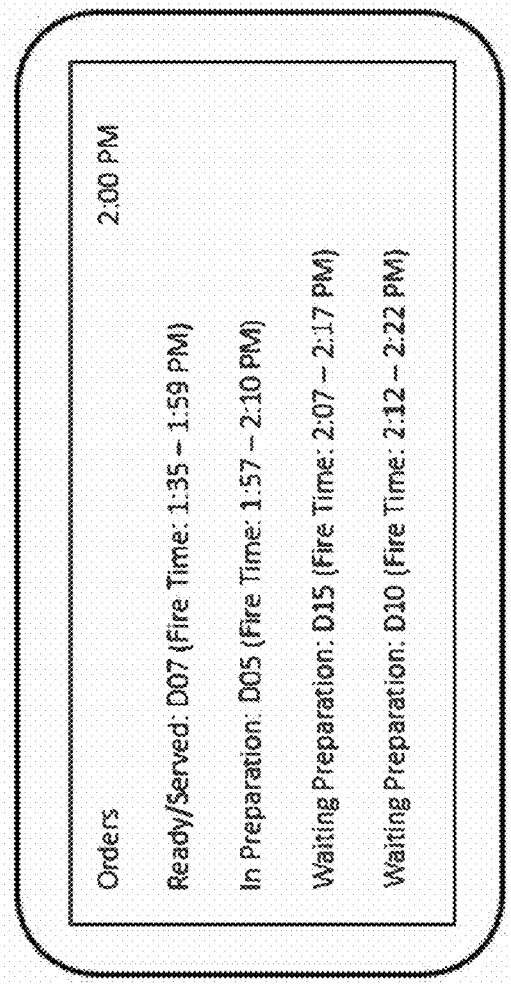
FIG. 9D is a schematic view of a possible visual display in the restaurant of an embodiment of the present disclosure showing order fire times.

Additional screens may be displayed in the dine-in restaurant location to help synchronize pre-ordered item preparation. For example, as shown in FIG. 9C, a display can be present in the dine-in restaurant location that illustrates which orders are currently being prepared, which orders are about to be prepared, and which orders are ready for service. In some embodiments, as is present in the embodiment shown in FIG. 9C, the customer identification number from a mobile application or customer-device based system may be displayed next to the status of the customer order. Based on the order status, the dine-in restaurant location wait staff can determine when to bring the order to a table in dining area of the restaurant. Further, in certain embodiment, as is shown in FIG. 9D, the order fire time can be presented next to status and order number of the customer order.

The screen displays in the dine-in restaurant location, including those shown in FIGS. 9A-9D, can be communicatively coupled with the systems that are processing the customer orders and real-time telematics of the customer device. The data processing unit and associated data storage will suitably be a computer programed and running software to perform the functions described. Implementation of such a data processing system is well within the capabilities of those skilled in the art.

FIG. 10—Dine-In Customer-Facing Visual Display

Beyond the staff-facing visual displays shown in FIGS. 9A-9D, the dine-in restaurant location can include customer-facing visual displays shown in FIG. 10 for use in the dining area of the dine-in restaurant. In preferred embodiments including such dine-in customer-facing visual displays, as shown in the illustrative embodiment of FIG. 10, the particular table that is associated with the dine-in customer order is specified. In such embodiments, the customers may utilize the screen to determine where their prepared food orders have been served. By allowing the customers to locate their order, the customer-facing visual display shown in FIG. 10 can help to reduce wait time at the dine-in restaurant location.

In some embodiments, the customer-facing visual display shown in FIG. 10 includes whether food and drinks have already been served to the table, are in the process of being served, or have yet to be served. For example, the customer-facing visual display may show that drinks have already been brought to a table and that the food is arriving at a particular time.

Figure 11:
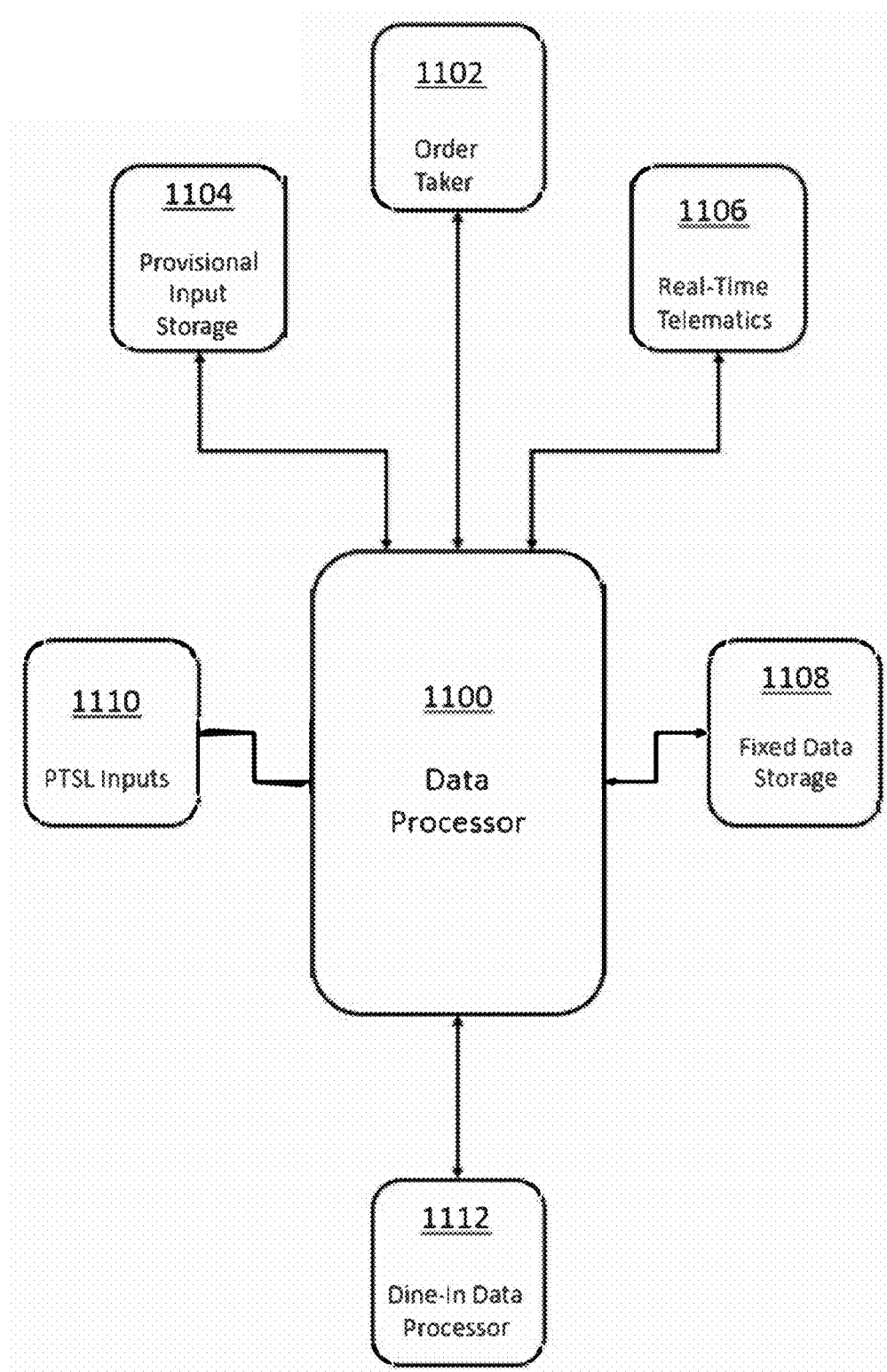
FIG. 11 is a flow diagram of the process showing data flow in a data processing unit.

FIG. 11—Dine-In Location System

Referring to FIG. 11, representing various embodiments, there is a flow process diagram of functions of the data processing unit. FIG. 11, 1100 is the computing data processing unit of the system. It will receive or access data from 1108 fixed data storage and write to the data storage system. The data, such as menu items, prices, preparation time, and the like, are "fixed" in the sense that they are not immediately variable.

The system will have a mechanism allowing a manager to log in and mark any item, such as "Sold Out," so that customers cannot continue ordering an item no longer in stock. The data may be updated as often as needed and there are means for updating the data. Temporary, calculated, and intermediate calculation values may be retained in the provisional input storage 1104; this provisional input storage functions synonymously with the function of data storage unit 132 in FIG. 3.

Immediate changes to customer input—prior to the retention in the provisional storage 1104—may come from order taker 1102. The change information coming from order taker 1102 includes changes to ordered item, edits, delay or requested times for arrival at the dine-in restaurant location, and the like.

There is also provided means for the Preparation Staff and order administration/management to input data on orders that are being processed. These will include, in some embodiments, individual computer tablets, or equivalent or larger display panels, that will have data on customer ID, ordered item, requested delay time, and calculated preparation order sequence. In some embodiments, the PTSL inputs 1110 and dine-in data processor 1112 work in conjunction with data processor unit 1100 for storage of data and rules to help optimize the order completion time being determined by the data processor 1100 in the system for synchronized pre-ordered item preparation at dine-in locations.

The data processor unit will calculate the needed information and send it to the appropriate location. In general, communication for the data processing unit to customer's display and preparation staff will be wireless. The data processing unit and data storage may be a dedicated system or operated by remote shared distributive computing ("the cloud"). A cloud system will generally be preferred.

FIG. 12—Restaurant

Figure 12:
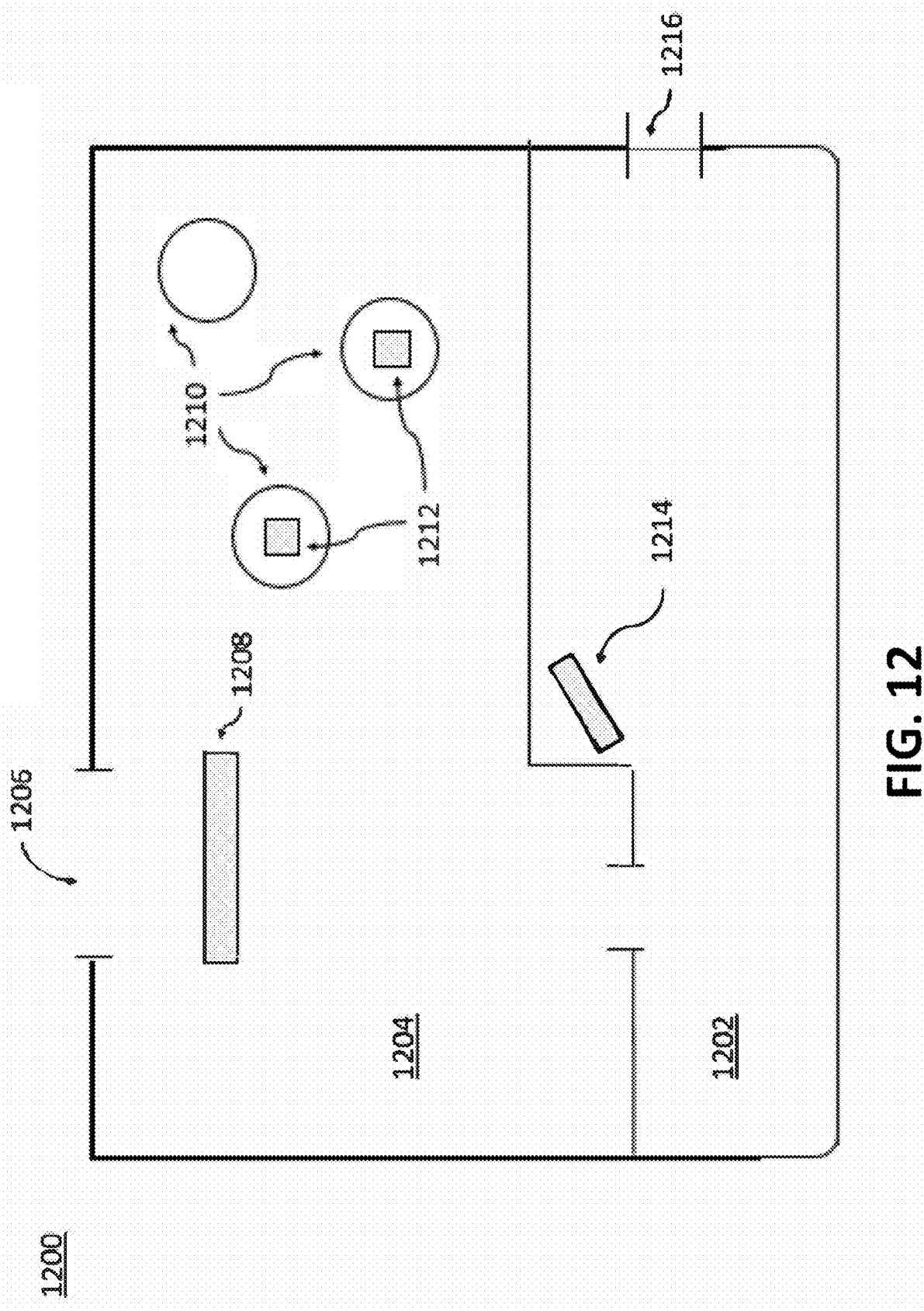
FIG. 12 is a schematic representation of a restaurant building for an embodiment of the present disclosure.

Referring to FIG. 12, which is an illustrative restaurant location system to facilitate synchronized pre-ordered item preparation of an embodiment of the disclosure, 1200 is a restaurant location (showing an exemplary building outline), 1216 is an order pick-up window, and 1206 is an entry way for dine-in customers. The restaurant is, in some embodiments, a traditional restaurant that contains a front-of-house dining area 1204 and a back-of-house kitchen 1202.

In preferred embodiments of the disclosure, the dining area 1204 includes a plurality of tables 1210. The plurality of tables 1210 may include a personal customer-facing visual display 1212, which can be positioned atop one or more of the tables in the plurality of tables 1210. The personal customer-facing visual display 1212 can be used in certain embodiments to show customers the exact table at which their orders were served. Further, in some embodiments, the personal customer-facing visual display 1212 can be configured to display the times when each item in the customer order was served to the table.

Moreover, in the dining area 1204, in preferred embodiments of the disclosure, the dining area 1204 includes a first customer-facing visual display 1208, which can be viewed by customers when entering the dine-in restaurant location 1200 through the entry way 1206. In some embodiments, the first customer-facing visual display 1208 can be configured to display an arrival time of the customer to the restaurant building and the corresponding table in the plurality of tables 1210. Additionally, the first customer-facing visual display 1208 can be configured to display a pathway to the corresponding table for the customer.

In the kitchen area 1202, in preferred embodiments of the disclosure, there is a staff-facing visual display 1214, such as those shown in FIGS. 9A-9D. The staff-facing visual display 1214 may be configured to display an order fire time, a corresponding order completion time, the arrival time of a customer to the restaurant building, and the corresponding table. Moreover, in either the kitchen area 1202 or another room available to the restaurant staff in the restaurant location 1200, certain embodiments include a dine-in location server, where the dine-in location server is communicatively coupled to a dine-in application for use on a customer device of the customer, which allows for the synchronized pre-ordered item preparation.

The restaurant 1200 allows for a quicker turn-over rate of the plurality of tables 1210. Moreover, in certain embodiments, the ability to pre-order, pre-pay, and pre-select a table reduce the amount of time that the customers will spend waiting in their vehicles prior to entering the restaurant. Thus, in some embodiments, the dine-in location system of FIG. 11 can be used in conjunction with the restaurant 1200 to facilitate quicker turns of parking spaces and queuing line real estate by moving customer vehicles through the entire dine-in process more expediently.

Customers who wish to dine in and have not pre-ordered, and do not wish to place mobile or online orders, are referred to herein as order-in-restaurant customers. Customers who wish to drive through and have not pre-ordered, and do not wish to place mobile or online orders, are referred to herein as order-in-line customers. Such order-in-line and order-in-restaurant customers may still utilize the restaurant location 1200. Moreover, in such embodiments, without the associated wait times, the amount of space dedicated to parking can be reduced for both order-in-line and order-in-restaurant customers.

Further Components and Variations
Presence Detection and Approaching Customer Identification In various embodiments, the restaurant location is provided with presence detection means (as discussed elsewhere herein), vehicle identification means (as discussed elsewhere herein), or both. In some such embodiments, the vehicle is identified as it approaches the order pick up window, and the identification is provided to wait staff. In some such embodiments, the wait staff select the order for the customer approaching the window, place the prepared orders in the order that customers are approaching the window in the order pick up lane, or both.

In some embodiments, a customer's license plate is associated with their order. The license plate identification sequence ('number'), in various embodiment and in various situations, is entered automatically by a license plate reader apparatus, is entered by the customer placing the order, is entered by a staff member taking the order, or other suitable means. In various embodiments, another identification means is used alternatively or in combination, including an image of the vehicle, an order number, a color and make of the vehicle, a one-dimensional or multi-dimensional scan code (such as a barcode, QR code, etc.), a store-provided order device (such as a device with a unique number that alerts the customer when an order is ready, and can also be identified by the restaurant location to direct customers when to merge), a mobile device (mediated, in some embodiments, by an application), etc.

In various embodiments, the order processing system automatically notifies customers to merge when the order is marked ready, at a specific time (e.g., a pre-determined amount of time before the calculated order ready time) or event (e.g., a trigger time, status change of order directly in queue before the customer's order to 'ready', etc.), another suitable trigger, or combinations thereof.

Lane Merging

In some embodiments, the restaurant location offers both a drive-through order lane(s) and a non-sequential order pick up window(s). Such embodiments are particularly advantageous for restaurant locations with existing traditional drive-through order lanes, or with a significant customer base that wishes to preserve a traditional drive-through ordering experience. In some such embodiments, an ordering lane is provided with a linear, sequential-access drive-through lane, where customers enter the lane, approach the ordering window, and place their order. At this point, customers do not wait to receive their order—thereby holding up other customers waiting to place their order.

In some embodiments, they directly merge into a non-sequential access drive-through lane as their order is ready. In some embodiments, they enter a waiting area, in common with people who have placed mobile or online orders, and enter a non-sequential drive-through lane as their order is ready (e.g. when they are notified by an order-ready board, by a text message, notification device handed to them at the order placement window and returned to the restaurant at the pick-up window, etc.). In some such embodiments, the customer is directed to circle the restaurant building and enter a waiting area, such as non-sequential waiting spaces, non-sequential queue lanes, parking spaces, etc.

The restaurant location can, thus, offer drive-through ordering and payment, while still preserving the convenience and time advantages to customers who have pre-ordered. Customers who wish to order at the location (order-in-line customers) can do so, while customers who wish to pre-order can pick up their order as it is ready, without being trapped in line behind order-in-line (non pre-order) customers.

Some embodiments merging a sequential drive-through order line with a non-sequential order pick up line are provided with merging control means to control the flow of traffic from multiple lanes into one (or at least into fewer) non-sequential order pick up lane. In some such embodiments, the merging control means comprises one or more presence detectors, such as a magnetic loop embedded in the road, ultrasonic sensor, video sensor, radar sensor, or other suitable apparatus.

The merging control means, in some embodiments, further comprises signaling means to direct traffic from various lanes when to enter the non-sequential pick up lane. In some such embodiments, the signaling means comprises a light signaling system for merging, such as having a red and green (or other suitable colors) for each lane. When a customer is to enter the non-sequential pick up lane, the light for their lane turns green. In some such embodiments, direct access (as opposed to access from the ordering/payment lane(s)) to the pick-up lane (such as from the parking lot, from queuing spaces and/or lanes, etc.) is 'green' (for go/enter) by default, while access from the ordering lane is 'red' (for stop/do not enter) by default. When the next order in line in the ordering/payment lane is ready, the direct access lane signal switches to 'red' (or other 'stop' signal), and the access from the ordering lane switches to 'green' (or other 'go' signal). In various embodiments, other appropriate signaling is used, such as words, rotating signs, audible signals, text messaging, etc.

Embodiments with an ordering lane merging directly into a pick up lane preserve the advantages of non-sequential access to order pick up based on order ready time, thereby preserving efficiency for pre-orders, and preserving order pick up time accuracy (e.g. not unnecessarily extending order pick up time by forcing customers to wait on orders being placed, prepared, and delivered in sequence)—customers are enabled to 'jump the line' at the restaurant by pre-ordering. Such embodiments are particularly useful for locations that are presently relatively traditional, sequential access ordering/payment I pick up locations, allowing them to add a 'jump the line' feature for non-sequential order pick up to incentivize customers who prefer the advantages of pre-ordering instead of waiting in line.

In some embodiments, such as some referenced above, a further advantage is added by extending the benefit of non-sequential order pick up to drive-through ordering customers. Such embodiments include those in which traditional drive-through order/payment I pick up locations are converted into non-sequential pick up locations by providing a non-window ordering and payment station. Such embodiments are particularly useful for locations that do not have the capability for two or more windows, or merging lanes together. Locations with only one window will, in some embodiments, convert their window into a non-sequential pick up only window.

Various such embodiments are provided with at least one of: an ordering station with a microphone, separate from the flow of the non-sequential pick up window; an ordering kiosk without a microphone; an ordering kiosk with a touchscreen with or without a microphone; one or more attendants with mobile ordering and payment stations (such as a tablet) in the parking lot; or other suitable means for taking orders. All such order and payment taking means, at least when used in these embodiments, are placed outside of the flow of the non-sequential order pick up window lane(s), thereby preserving customer access to the order pick up window when their order is ready. All such order taking means preferably accept payment as well. Some are capable of accepting cash, checks, or both, while others only accept electronic forms of payment (such as at least one of debit and credit cards, Apple Pay, Paypal, Google Pay, Venmo, Bitcoin, etc.).

In some embodiments extending the benefit of non-sequential order pick up to drive-through ordering customers, at least one ordering lane is provided. The ordering lane provides access to a plurality of queuing parking spaces, enabling a customer to place an order and pay for it, and then move to a queuing space and wait to enter the non-sequential order pick up window just like pre-order customers. Such embodiments can, in a measure, provide the 'best of both worlds' for pre-order and drive-through-ordering customers, allowing both to order in their preferred way, while also allowing both pre-order and drive-through-ordering customers to pick up their order in a non-sequential manner according to the order-ready time.

Multiple Order Channels

In some embodiments, the restaurant merges orders from multiple order-receiving channels, and distributes the orders after preparation back out to the proper channel. Channels include, in various embodiments, at least one of: custom mobile phone application, custom website, third-party app, third-party website, or food services (such as GrubHub, Favor, FourDoor, Dash, etc.). In some such embodiments, the restaurant provides a separate pick up area, a separate order pick up window, or both, for delivery services. In such embodiments, a third-party delivery driver comes to a designated pick up area I window, while a direct customer comes to a different pick up area I window. In some embodiments merging orders from multiple order-receiving channels, the order-receiving channels are reduced by restricting all orders from the order pick up window, and re-directing them to another channel (such as mobile ordering).

Multiple Locations

In some embodiments, a common ordering system is provided across multiple restaurant locations. In some such embodiments, calls for multiple locations are routed to a common call center (or regional call centers). Such embodiments allow a single call center for multiple stores, which provides advantages to customers and restaurant staff. Restaurant staff are calmer—wait staff are not having to handle juggling phone calls, or at least not the same frequency of phone calls, and wait staff do not have the problems with hearing customers due to the background noise of a busy restaurant. Customers receive calmer, more focused service, less background noise, and more accuracy in their orders. The ability to call is useful, for example, for people who want to pre-order but are not comfortable with mobile or online ordering, for larger orders that are inconvenient or unable to purchase over the online or mobile ordering system, and for questions regarding policies, menu, service, billing issues, etc.

Order Selection Accuracy

In many embodiments, the system and methods are optimized for accurate order delivery (including handoff at an order pick up window) to the customer. When the orders are prepared and waiting for pick up, it is always a risk that the wrong order is handed off to the wrong customer. This is particularly challenging when there is more than one order pick up window. It is also particularly challenging when there are multiple customers with the same name, if the name is used to identify the order.

In many embodiments, order accuracy is increased—as well as operational efficiency—by enabling a single order pick up window to be used, because the customers in the drive through at any given time are greatly reduced by non-sequential access as the orders become ready (as discussed elsewhere herein). In some embodiments, the order system displays order information on screens (such as a tablet, a computer screen, an order display in the production area, etc.). In some embodiments, the order system prints off a sheet for each order, or a sheet with multiple orders, with the relevant details of the order for wait staff to use in production and delivery.

In some embodiments, as discussed elsewhere herein, the staff are notified as a customer is approaching the order pick up window, and given identifying information on the customer (such a license plate, order ID by identifying a mobile device in the customer's vehicle, etc.), giving staff time to locate and double-check the order before the customer appears at the pick-up window. In some embodiments, the order system highlights 'doubled names' to alert staff that there are multiple orders with the same or similar identifying information. Various embodiments highlight doubled identifying information—customer-input order ID, vehicle physical characteristics, customer name, etc. In some embodiments, a unique ID is provided to each order that prevents doubling.

Customer Locating

The order system is also capable, in some embodiments, of acquiring the location of a customer by receiving information from a global positioning system (GPS) system in the customer's mobile device or computer. GPS coordinates of the ordering customer is received from their mobile device and sent to the ordering system, or locating service or system connected to the ordering system, to aid in calculating travel time to better estimate a "future" pick up time. This is especially helpful for a restaurant along a highway. Potential customers can search down their travel route for a suitable restaurant, order using their mobile device, and have the system tell them how much time is required to reach the destination pick up location. Operation of a similar GPS system for ordering is disclosed in US published application U.S. 2006/0293971, the relevant disclosures of which are incorporated herein by reference. U.S. Pat. No. 8,059,029 discloses a GPS tracking system with helpful information on the way and means to set up an appropriate GPS ordering system. The relevant disclosure of U.S. Pat. No. 8,059,029 are incorporated herein by reference.

In another embodiment the same GPS tracking is used to enable drone delivery or any other delivery method to static locations or moving vehicles while in transit. For the example above, the customer may wish to order, but not stop; preferring to have a drone meet the moving vehicle with the food order.

Mapping

In some embodiments, the ordering system is provided with, or connected to, mapping software. In some such embodiments, the ordering system is provided with internal maps with delivery-time zones, used to calculate delivery time to the customer's location. In some embodiments for multi-location restaurants, the ordering system is further provided with store-delivery-range zones. The customer's location is determined, and the order is routed to the appropriate location to make and deliver, based on store-delivery-range zones. In some such embodiments, some locations provide delivery service, and some do not; in such embodiments the ordering system routes delivery orders only to locations providing delivery service. The ordering system takes delivery time into account in queuing the order and providing an estimated order delivery time, as discussed elsewhere. It is a particular advantage to accurately estimate delivery time for the customer and for production timing and slip-logic, as for many restaurants and locales, delivery time is greater, and often much greater, than production time. Accordingly, providing accurate timing to the customer, and efficient production, relies heavily on reasonably accurate delivery timing and estimation.

In some embodiments, the restaurant is listed with at least one mapping service or app (such as Google Maps, Apple Maps, Bing Maps, OpenStreetMaps, MapQuest, Yahoo! Maps, Wikimapia, etc.), travel service or app (such as Tripit, Airbnb, Roadtrippers, TripAdvisor, etc.), or other such service or app. A customer is preparing a trip, or is on the road, and searches restaurants near a given location. When the restaurant appears on the search, and is selected by the customer, the ordering system (an app, website, or other suitable means) receives a customer's location from the app or service (such as through attributes of the URL passing location (such as a 'GET' method), variables passed through an application programming interface (such as a 'POST' method), permission to access the current location of the customer from the device directly, etc.).

The order system highlights menu options that will be ready by the time the customer arrives, restricts items that will not be ready, or some combination thereof. The customer places the order as discussed elsewhere herein, and the restaurant prepares the order likewise. The customer can, in such embodiments, have a meal ready for them—potentially higher quality than fast food in terms of taste, options, health, etc.—with minimal delay in their trip.

In various embodiments, the order system estimates the time from the customer's current location to the restaurant location by at least one of: receiving an estimated travel time from the mapping service or app, receiving a distance from the mapping service or app and calculating an estimated travel time therefrom, receiving a current customer location from the mapping service or app and using a third-party mapping service to estimate travel time, receiving a current customer location from the mapping service or app and using an internal mapping algorithm to estimate travel time, other appropriate means, or some combination thereof.

In some embodiments, at least part of the ordering system is provided by a third party, and individual restaurants or restaurant chains have the option of subscribing to or otherwise participating in this multi-vendor ordering system. In some such embodiments, the multi-vendor ordering system integrates with one or more mapping services or apps—which in various embodiments are third-party or are directly incorporated into the software.

In such embodiments, customers can search a map for restaurants near a given location, or along a given route. The customer can filter for restaurants participating in the multi-vendor ordering system (or the search is restricted only to participating restaurants), and then can place an order seamlessly. The multi-vendor ordering system presents ordering information to the customer, and sends the order to the restaurant. In some embodiments, the multi-vendor ordering system at least handles all interaction of the customer with the ordering system, such that the customer never has to leave the unified interface, and may order from one or more restaurants directly from the interface.

In some embodiments, the multi-vendor ordering system allows restaurants to customize the look and feel of the menu on their ordering system, within general system or app parameters.

Various embodiments using mapping and order systems allows the customer to order through virtual assistants, such as Cortana, Siri, Alexa, Google, etc., using voice commands. It is said that the most common restaurant internet (including mobile) search is "restaurants near me." It may well become "restaurants on my route." The present disclosure provides advantages, for example, in convenience and increased choice to customers. It also provides advantages, for example, in efficiency and increased customer engagement and potential customer base for restaurants.

Delivery

In some embodiments, the restaurant provides external order delivery service, actually delivering the order to a customer-specified location. In some embodiments, the restaurant provides external order delivery through at least one third-party delivery service (such as GrubHub, Favor, Four-Door, Dash, etc). In some embodiments, the restaurant provides external order delivery at least through restaurant-specific delivery personnel, whether employees or contractors. In some embodiments, the external order delivery personnel pick up orders to deliver to customers at the order pick up window. Such embodiments provide easy integration of delivery drivers; the non-sequential access prevents delivery personnel from unduly interfering with the flow of customers.

In some embodiments, the personnel pick up orders to deliver to customers at a separate location, such as a dedicated delivery-personnel order pick up window. Such embodiments are especially useful for locations with relatively high volumes and/or relatively high percentages of external delivery orders, separating the delivery personnel from the flow of normal customer pick up traffic, and preventing delivery personnel traffic from slowing down the flow of customer pick-ups, particularly when the drivers are picking up multiple orders to deliver. Such embodiments having a dedicated delivery personnel order pick up window preserve the efficiency of non-sequential access for drivers, especially by eliminating the need for drivers to find a parking space and enter the restaurant.

In some embodiments, a customer is provided with the option to convert their pick up order to an external delivery order. For example, a customer may have placed a pick up order, received an order-ready time (e.g., 15 minutes), and planned to leave the office in 10 minutes, drive for 5 minutes, and pick up the order when ready. If the customer then became engaged in a meeting, phone call, car refused to start, etc., the customer can access the order again (e.g., on a mobile device, computer with online access, telephone, etc.) and request that the order be converted to a delivery order. The order is assigned to a delivery driver, and the order-delivery time is then calculated. No interruption of restaurant workflow is caused, and the customer can still conveniently receive their order.

Such an embodiment works particularly smoothly in a location with an order pick up window for customers and delivery drivers, where the order is simply picked up by a delivery driver instead of the customer. The order system is updated to indicate pick up by the delivery driver, and the restaurant wait staff can verify the order pick up person accordingly. In embodiments having a separate delivery driver window, the order can be transferred to the delivery driver pick up area in the restaurant, or a shared area having access to the customer order pick up window(s) and the delivery driver order pick up window(s).

In some embodiments, the order system allows the customer to designate another person, such as a family member or third-party delivery driver, to pick up the order. The customer can, in various such embodiments, designate another person by email, phone number, name, etc. In some cases, in some embodiments, the ordering system allows the customer to send the order, or certain data regarding the order, directly to the designated person. The order system updates the information associated with the order, and wait staff at the restaurant location can validate the person picking up the order against the information in the order system.

Location-Triggered Order Preparation

In some embodiments, the ordering system is optimized for fresh-cooked food, which is particularly advantageous for restaurant locations that specialize in food being just prepared as the customer receives it. In some such embodiments, the ordering system is provided with internal or external maps, and the capability of estimating travel time to the restaurant location(s), either internally, or through connection with an external module or system. Customers with mobile devices having location abilities (such as equipped to communicate with global positioning system (GPS), GLONASS, etc.). The mobile device (potentially embedded in a vehicle) runs a software (such as mobile app) that conveys the customer's location to the order system. The order system monitors the customer's location, calculates the time required to arrive, and triggers order preparation to start once the calculated time from the customer's current location is approximately the same as the order preparation time.

In various embodiments, positive or negative buffers are added to increase the likelihood of the order being ready when the customer arrives (positive buffer—time is added), or to make sure that the order is being completed as the customer arrives (negative buffer—time is subtracted)—such as for a restaurant that completes and serves an order in the presence of the customer. In some embodiments, the system does not continually calculate the time from the customer's current location to the restaurant location, but instead is provided with a pre-determined distance range from the restaurant location: when the customer enters that range, the order system triggers preparation of the order.

In some embodiments, mobile devices, vehicles, etc. having software reading at least one inertial sensor (such as accelerometer, gyro, etc.), and the customer inputs the location from which they will be departing. Once the software (such as a mobile app) detects steady motion of the mobile device or vehicle rate indicating the customer is driving, the software notifies the restaurant location. The restaurant location calculates (or has previously calculated) the distance from the customer's location to the restaurant location, as well as the time required for order preparation, and begins preparation of the order in time for it to be finished at or about the time the customer arrives.

EXAMPLE EMBODIMENTS

Example 1

In some embodiments of the present disclosure, a coffee shop with in-store service and a typical drive-through window is adapted for non-sequential order pick up. In some such embodiments, the window is converted to order pick up only, or an additional order pick up only window is added. In either case, the order pick up window has direct access, and no microphone, and is designed to not be blocked by traffic that is ordering. In some alternative embodiments, an ordering station is provided, such as by adapting the lanes to provide independent access to the pick-up window, and to the previous ordering station. The previous ordering station is converted to an independent order placement station, at which customers may place (and, in some embodiments, pay for) their order, and then exit the ordering station and lane, and enter parking or queuing spaces until their order is ready, at which point they enter a non-sequential drive-through lane to approach the order pick up window.

Example 2

In some embodiments, a primarily dine-in restaurant utilizes the ordering system of the present disclosure. In some such embodiments, customers place at least some portion of their order, including a desired dining time, via an internet-connected device or mobile device, by phone, etc., and receives an expected dining time. The ordering system provides the expected dining time by taking into account the current number of tables and seating available, current and expected number of customers, wait staff levels, etc. The restaurant prepares the order, sets the table, and is ready for the customers when they arrive at or near the expected dining time. More than just 'reserving' a table, the ordering system allows the table to be reserved easily, without having to call or stop by the restaurant. It also allows the restaurant to maximize usage of available seating, tables, staff, etc. by reserving for a more accurate time and providing an accurate expected dining time. It reduces the inconvenience and annoyance to customers of standing in line waiting to be seated, by providing them an accurate expected dining time.

Example 3

Some embodiments of the present disclosure comprise a convenience store or travel center that serves food, such as sandwiches, hot dogs, breakfast pastries, tacos, hamburgers, desserts, etc. Customers can pre-order a menu item, or at least choose from a subset of the menu provided in the store. In some embodiments, the store adds a non-sequential order pick up window and associated lane. In some embodiments, the customer picks the order up in-store at a dedicated non-sequential pick up area. Accordingly, the customer can use time during travel to place the order, and minimize time waiting for a hot meal at the travel center, convenience store, etc.

Example 4

Some embodiments of the present disclosure comprise a restaurant offering a customizable build-your-own entree— such as build-your-own sandwiches, burritos, tacos, pizzas, hamburgers, salads, etc. The restaurant accepts pre-orders at least online or through a mobile device, including all or a subset of available customizations. Customers are able to place an order online, including their customizations, and receive an order-ready time (depending on various factors, including whether the order is placed with a desired pick up time or as an ASAP order). The restaurant provides a dedicated non-sequential order pick up area, non-sequential order pick up window, or both, where customers can pick up their order without waiting in line. This provides an especial advantage for customers and restaurants in such locations, where the line typically moves more slowly because of the many choices customers must make during customization. Additionally, customers are easily able to distinguish when placing their order between free and add-on customizations, and the price of add-on customizations, without the annoyance of repeatedly asking restaurant staff or searching a menu or menu board.

Example 5

Some embodiments of the present disclosure comprise a restaurant offering delivery of the order to the customer's desired location through at least one third-party food delivery service, either in combination with, or in place of, restaurant delivery staff. In some such embodiments, the customer requests delivery (versus pick-up) when placing the order, or at some point after placing the order. The order system queues the order as discussed elsewhere herein, and schedules a driver to make the delivery with a third-party food delivery service (such as Favor, GrubHub, etc.). The driver comes to a non-sequential order pick up area (such as a common pick up window for both drivers and customers, or a dedicated driver pick up window), picks up the order, and delivers it to the restaurant.

In various embodiments, the order is initially placed through the restaurant's order system, or through a third party order system (such as for a food delivery service) and then transferred to the restaurant order system. In some embodiments, the restaurant is a food delivery service only location, having a pick up window or area (preferably a drive-through window) with non-sequential access for food delivery service drivers.

In some embodiments, an additional calculated time— driver summons—is provided that is calculated at least based on available drivers, time required for drivers to arrive at the restaurant, and order preparation time. In some such embodiments, the order system obtains information on present driver availability and location through at least one connection to food delivery service systems (such as through an application programming interface). In some such embodiments, the order system does not use or calculate the driver summons time. In some embodiments, the order system queues the order, and reserves a pick up time with a driver. In some embodiments, the order system calculates driver summons time based on the likelihood of a driver being available within a given driving distance (or time, or both), and triggers a summons of a driver when the driver summons time is reached. The driver summons time may be before order production begins, or afterwards, depending on the calculated production time of the order, and the estimated time for a driver to arrive.

Example 6

Some embodiments of the present disclosure comprise a 'fast-food' type restaurant that traditionally does not have a drive-through option, such as many quick-preparation or pre-prepared pizza locations. Such restaurant locations can add a non-sequential access order pick up window (in some such embodiments, the window having no microphone and no provision for placing or paying for an order) and mobile/ online ordering, such that customers can order online, and pick up their order at a pick up window. While many such locations would not be able to add a traditional drive through window due to space constraints, the present disclosure, as discussed elsewhere herein, allows the addition of a drive-through pick up window with minimal impacts on available space.

Example 7

The present disclosure is advantageous in various embodiments for locations with restricted space insufficient for current requirements for traditional drive-through order and pick up lines. For example, a restaurant seeking to utilize a location on a corner lot that is ideal for a fast casual food drive-through pick up location due to proximity to target clientele, but prevented from doing so by having a lot too small for the required number of vehicles in a sequential access drive-through lane, can apply an embodiment of the present disclosure in order to utilize the location for drive-through pick up.

In one particular such situation, a location was currently being used for both customer sit down and inside customer pick up, as well as for in-store delivery driver pick up.

Customer drive-through order pick up was planned to add to the location, but the lot size, surrounding development, and city requirements prevented a standard, sequential drive-through lane and window to be added, because the length of the lane required to accommodate the number of vehicles at one time required by the city (in order to prevent the wait line from spilling onto the road or adjoining businesses) was too large for the lot. The location incorporated a non-sequential drive-through order pick up window configured only for pick-up of previously placed orders, successfully eliminating the need for a long, space-inefficient sequential drive-through lane.

Additionally, the location offers the convenience and speed advantages of the non-sequential order pick up lane and window to its customers, offering the convenience of picking up orders without exiting the vehicle, and the speed of entering the pick-up lane and approaching the window only when the order is ready, avoiding trapping customers in a lane and requiring them to wait on slow order placement or preparation of large orders.

Example 8

Some embodiments of the present disclosure comprise a plurality of food trucks utilizing one or more ordering systems, the ordering system(s) having a common customer interface. Customers order online, through a mobile device, or at a kiosk, at least by selecting the food truck, and then placing an order with that food truck. The common customer interface passes the order to the individual food truck's ordering system for production queuing, and provides the customer an order-ready time for pick up. The customer can then go to the specified food truck to pick up their food in a non-sequential pick up manner at a given time. Food trucks particularly lend themselves to providing a dedicated pre-order pick up area (such as a window, or part of a large window or bay), as they are typically not drive-through. In some embodiments, having food trucks that move from place to place, the common customer interface provides the customer with the location of the food truck at the time the order is to be picked up.

In such embodiments, customers are able to more fully engage the offerings of food trucks with greater convenience, by not having to find the food truck and peruse the menu at any given time. Instead, the customer can access the food truck's menu electronically, place the order, and then pick up the order at the present location of the food truck. This is particularly useful in crowded cities and areas where food trucks are often popular. Additionally, such embodiments are useful to food trucks to extend their customer base to people who do not have the time to track down the food truck, place an order, and wait for preparation.

Example 9

Some embodiments of the present disclosure comprise a travel center, visitor's bureau, university campus, library, employee lounge, or other common area, having a kiosk, a guest wi-fi with a landing web page, or other such commonly accessed interface. The interface provides a selection of local restaurants to choose from, each having ordering systems providing production timing and slip-logic control of orders, and providing non-sequential order pick up. The ordering systems have a common user interface, or application programming interface that is used by the commonly accessed interface (CAI). A user selects a restaurant on the CAI, and places an order, as discussed elsewhere herein. The CAI provides an order ready (or order delivery, if delivery is chosen) timing estimate which, in preferred embodiments, is generated by the restaurant's ordering system and passed to the CAI to display to the customer. If order pick up is chosen, the CAI provides the customer the restaurant location for pick up.

Such embodiments are particularly useful for customers who wish to quickly access restaurants serving a common area, without having to filter through internet search results, a phonebook, or the like, for a reasonable driving, walking, or delivery time. Additionally, it provides an excellent marketing opportunity for restaurants in an area to make their location and menu accessible to a relatively large, targeted customer base.

Example 10

Some embodiments of the present disclosure comprise a dine-in restaurant location, coffee shop, or other common dining area, having a plurality of tables that encompass a variety of characteristics. For example, a single restaurant may have table choices that include booth seating, chair seating, barstool seating, outdoor seating, high top tables, and picnic-style tables. The exemplary restaurants may utilize ordering systems having a common user interface, or application programming interface that is used by the commonly accessed interface (CAI). A user selects a restaurant on the CAI, and places an order, as discussed elsewhere herein. In some embodiments, after the customer has placed an order for a dine-in meal, the interface provides a selection of table characteristics for the customer to choose from, each corresponding to available seating in the restaurant. In some embodiments, the CAI provides a selection of available tables matching the customer's preferred characteristics and allows the customer to select a particular table for dining. The CAI, in such embodiments, then provides the customer the particular table location in the restaurant.

Such embodiments are particularly useful for customers who desire a dine-in restaurant experience, but also want a quick and efficient dining experience. These customers minimize their wait time by selecting the particular available table before they arrive at the restaurant. Accordingly, both the customer and the restaurant benefit from minimizing turn-over times as the table will be ready for dining at the time of the customer's arrival at the restaurant. An additional benefit is that such an embodiment allows for customers to know where to guide themselves as soon as they enter the dine-in restaurant, which minimizes wait times associated with host-guided seating. In these embodiments, the customers can arrive at their pre-selected, reserved table at the simultaneous moment that the pre-ordered food and beverages are served at the table.

CONCLUSION

The disclosure claimed has been herein disclosed sufficiently for persons skilled in the art to comprehend and practice. While the disclosure may be susceptible to various modifications and alternative forms, specific embodiments have been shown by way of example in the drawings and have been described in detail herein. The various embodiments, examples, and illustrations disclosed herein, while representing the best and various alternative modes of carrying out the disclosure as currently contemplated by the inventors, are by no means limiting or exhaustive, but serve as an aid to comprehending the full nature and scope of the disclosure.

It should be understood that the disclosure is not intended to be limited to the particular forms disclosed. Rather, the disclosure is to cover all modifications, equivalents, and alternatives falling within the spirit and scope of the disclosure as defined by the following appended claims. Various other embodiments will become apparent which fall within the scope of this disclosure and claims.

It should be noted that section titles or headers are provided for convenience only, and are not to be taken as limiting the scope of the descriptions thereunder.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid-state drives, and optical data storage devices. The computer readable medium can also be distributed over network-coupled computer systems so that the computer readable code is stored and executed in a distributed fashion.

Consistent with the above disclosure, the examples of systems and method enumerated in the following clauses are specifically contemplated and are intended as a non-limiting set of examples.

Clause 1. A system including: a customer device of a customer including at least one processor; a dine-in application for use on the customer device; a real-time telematics device communicatively coupled to the customer device, wherein the real-time telematics device includes a processor with a graphical interface, and is configured to collect real-time telematics information of the customer, where the real-time telematics information is based on a global position of the customer device and current driving information; and a dine-in location server configured to provide one or more menu selection information, where the dine-in location server is communicatively coupled to the dine-in application for use on the customer device and causes the at least one processor on the customer device to provide interactive menu and ordering information to a customer, where the interactive menu is configured to display menu information available at a dine-in location; receive a provisional input from the customer including one or more menu selections, and real-time telematics information of the customer, where the real-time telematics information is based on a global position of the customer device and current driving information; determine an arrival time of the customer to the dine-in location; transmit the arrival time of the customer and the one or more menu selections to the dine-in location; and optimize an order completion time based on the real-time telematics and the arrival time of the customer to the dine-in location.

Clause 2. The system of any foregoing clause, where the dine-in location server further causes the at least one processor on the customer device to obtain a set of production timing and slip logic (PTSL) rules for generating a dynamic preparation order as a function of PTSL inputs including the one or more menu selections, a current dine-in queue, configurable variables including a cook time for each of the one or more menu selections, and the real-time telematics information of the customer.

Clause 3. The system of claim 2, wherein the dine-in location server further causes the at least one processor on the customer device to apply the PTSL rules to optimize the order completion time, and generate an order fire time, where the order fire time is set to end at order completion time.

Clause 4. The system of any foregoing clause, where the dine-in location server further causes the at least one processor on the customer device to display, at the dine-in location, the order completion time and the arrival time of the customer to the dine-in location.

Clause 5. The system of any foregoing clause, further including a table in the dine-in location, where the table is set to receive a completed order including at least one of the one or more menu selections.

Clause 6. The system of any foregoing clause, where the provisional input further includes a selection of a table in the dine-in location, where the table is chosen from a list of available tables presented in the ordering information.

Clause 7. The system of any foregoing clause, further including a table in the dine-in location, wherein the table is reserved for the number of guests at least by the order completion time.

Clause 8. The system of any foregoing clause, where the processor is configured to dynamically repeat at least one of the processing steps from Clause 1 responsive to an update of the provisional input from the customer.

Clause 9. The system of any foregoing clause, where the current driving information comprises at least one of local traffic reports, standard traffic conditions, road structures, location, destination, route, and combinations thereof.

Clause 10. A method, including: providing interactive menu and ordering information to a customer, where the interactive menu displays menu information available at a dine-in location; receiving a provisional input from the customer including one or more menu selections, and real-time telematics information of the customer, where the real-time telematics information is based on a global position of the customer and current driving information; responsive to receiving the provisional input, determining an arrival time of the customer to the dine-in location; transmitting the arrival time of the customer and the one or more menu selections to the dine-in location; and optimizing an order completion time based on the real-time telematics and the arrival time of the customer to the dine-in location.

Clause 11. The method of any foregoing clause, further including obtaining a set of production timing and slip logic (PTSL) rules for generating a dynamic preparation order as a function of PTSL inputs including the one or more menu selections, a current dine-in queue, configurable variables including a cook time for each of the one or more menu selections, and the real-time telematics information of the customer.

Clause 12. The method of any foregoing clause, further including applying the PTSL rules to optimize the order completion time, and generate an order fire time, wherein the order fire time is set to end at order completion time.

Clause 13. The method of any foregoing clause, further including displaying, at the dine-in location, the order completion time and the arrival time of the customer to the dine-in location.

Clause 14. The method of any foregoing clause, further including, responsive to the display at the dine-in location, providing a completed order including at least one of the one or more menu selections to a table in the dine-in location, where the table is reserved for the customer.

Clause 15. The method of any foregoing clause, including dynamically repeating at least one of steps from Clause 10 responsive to an update of the provisional input from the customer.

Clause 16. The method of any foregoing clause, where the provisional input further includes a selection of a table in the dine-in location, where the table is chosen from a list of available tables presented in the ordering information and the table is reserved for the customer.

Clause 17. The method of any foregoing clause, where the current driving information comprises at least one of local traffic reports, standard traffic conditions, road structures, location, destination, route, and combinations thereof.

Clause 18. A system including: a restaurant building including a dining area and a kitchen, where the dining area has a plurality of tables; one or more first visual displays, positioned inside the dining area, configured to display an arrival time of the customer to the restaurant building and a corresponding table, where the corresponding table is one or more table in the plurality of tables; a second visual display, positioned inside the kitchen, configured to display an order fire time, a corresponding order completion time, the arrival time of a customer to the restaurant building, and the corresponding table; and a dine-in location server, where the dine-in location server is communicatively coupled to a dine-in application for use on a customer device of the customer.

Clause 19. The system of any foregoing clause, where the one or more first visual displays are positioned atop one or more table in the plurality of tables.

Clause 20. The system of any foregoing clause, where at least one of the one or more first visual displays is configured to display a pathway to the corresponding table for the customer.

I claim:

1. A system for synchronized pre-ordered item preparation at one or more dine-in locations, the system comprising:
    (a) a customer device of a customer comprising at least one processor, wherein the customer device is configured to collect real-time telematics information of the customer based on a global position of the customer device;
    (b) an application for use on the customer device; and
    (c) a server configured to provide one or more menu selection information, wherein the server causes the at least one processor on the customer device to:
        (i) provide interactive menu and ordering information to a customer, wherein the interactive menu is configured to display menu information available at a dine-in location;
        (ii) receive an input from the customer comprising one or more menu selections;
        (iii) determine an arrival time of the customer to the dine-in location based on the real-time telematics information;
        (iv) transmit the arrival time of the customer and the one or more menu selections to the dine-in location; and
        (v) optimize an order completion time based on the arrival time of the customer to the dine-in location.

2. The system of claim 1, wherein the server further causes the at least one processor on the customer device to obtain a set of production timing and slip logic (PTSL) rules for generating a dynamic preparation order as a function of PTSL inputs comprising:
    (a) the one or more menu selections,
    (b) a current dine-in queue,
    (c) configurable variables comprising a cook time for each of the one or more menu selections, and
    (d) the real-time telematics information of the customer.

3. The system of claim 2, wherein the server further causes the at least one processor on the customer device to apply the PTSL rules to:
    (a) optimize the order completion time, and
    (b) generate an order fire time, wherein the order fire time is set to end at order completion time.

4. The system of claim 1, wherein the server further causes the at least one processor on the customer device to display, at the dine-in location, the order completion time and the arrival time of the customer to the dine-in location.

5. The system of claim 1, wherein the input further comprises a selection of a table in the dine-in location, wherein the table is chosen from a list of available tables presented in the ordering information.

6. The system of claim 1, wherein the input further comprises a number of guests associated with the input.

7. The system of claim 6, further comprising a table in the dine-in location, wherein the table is reserved for the number of guests at least by the order completion time.

8. The system of claim 1, wherein the at least one processor is configured to dynamically repeat at least one of steps (d)(i) through (d)(iv) responsive to an update of the input from the customer.

9. The system of claim 1, further comprising optimizing the order completion time based on current driving information comprising at least one of local traffic reports, standard traffic conditions, road structures, location, destination, route, and combinations thereof.

10. A method for synchronized pre-ordered item preparation at one or more dine-in locations, the method comprising:
    (a) providing an interactive menu to a customer, wherein the interactive menu displays menu information available at a dine-in location;
    (b) receiving a input from the customer comprising:
        (i) one or more menu selections, and
        (ii) real-time telematics information of the customer, wherein the real-time telematics information is based on a global position of the customer;
    (c) responsive to receiving the input, determining an arrival time of the customer to the dine-in location based on the real-time telematics information;
    (d) transmitting the arrival time of the customer and the one or more menu selections to the dine-in location; and
    (e) optimizing an order completion time based on the arrival time of the customer to the dine-in location.

11. The method of claim 10, further comprising obtaining a set of production timing and slip logic (PTSL) rules for generating a dynamic preparation order as a function of PTSL inputs comprising:
    (a) the one or more menu selections,
    (b) a current dine-in queue,
    (c) configurable variables comprising a cook time for each of the one or more menu selections, and
    (d) the real-time telematics information of the customer.

12. The method of claim 11, further comprising applying the PTSL rules to:
    (a) optimize the order completion time, and
    (b) generate an order fire time, wherein the order fire time is set to end at order completion time.

13. The method of claim 10, further comprising displaying, at the dine-in location, the order completion time and the arrival time of the customer to the dine-in location.

14. The method of claim 13, wherein a table is reserved for the customer at the dine-in location.

15. The method of claim 10, further comprising dynamically repeating at least one of steps (a) through (e) responsive to an update of the input from the customer.

16. The method of claim 10, wherein the input further comprises a selection of a table in the dine-in location, wherein the table is chosen from a list of available tables and the selection causes the table to be reserved for the customer.

17. The method of claim 10, further comprising optimizing the order completion time based on current driving information comprising at least one of local traffic reports, standard traffic conditions, road structures, location, destination, route, and combinations thereof.

18. A dine-in location system to facilitate synchronized pre-ordered item preparation, the system comprising:

(a) a restaurant building comprising a dining area and a kitchen, wherein the dining area has a plurality of tables;

(b) one or more first visual displays configured to display an arrival time of the customer to the restaurant building and a corresponding table, wherein the corresponding table is one or more table in the plurality of tables;

(c) a second visual display configured to display at least one of an order fire time, a corresponding order completion time, the arrival time of a customer to the restaurant building, and the corresponding table.

19. The dine-in location system of claim 18, wherein the one or more first visual displays are positioned atop one or more tables in the plurality of tables.

20. The dine-in location system of claim 18, wherein a pathway to the corresponding table is presented to the customer.

* * * * *